United States Patent
Cook et al.

(10) Patent No.: US 12,147,557 B2
(45) Date of Patent: Nov. 19, 2024

(54) PRIVACY-PRESERVING DATASET SKETCHES THAT CAN BE JOINED NON-INTERACTIVELY

(71) Applicant: Amazon Technologies, Inc., Seattle, WA (US)

(72) Inventors: James Alexander Cook, Toronto (CA); Nina Mishra, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 183 days.

(21) Appl. No.: 17/810,306

(22) Filed: Jun. 30, 2022

(65) Prior Publication Data

US 2024/0005022 A1 Jan. 4, 2024

(51) Int. Cl.
  *G06F 21/62* (2013.01)
  *G06F 16/2455* (2019.01)
  *G06F 21/00* (2013.01)

(52) U.S. Cl.
  CPC ...... *G06F 21/6227* (2013.01); *G06F 16/2456* (2019.01)

(58) Field of Classification Search
  CPC .. G06F 21/6227; G06F 21/2456; G06F 21/60; G06F 21/604; G06F 21/62; G06F 21/6218; G06F 21/6245; G06F 21/6254; G06F 21/64
  See application file for complete search history.

(56) References Cited

U.S. PATENT DOCUMENTS

2023/0144763 A1* 5/2023 Peng .................. G06F 16/215
  707/692

OTHER PUBLICATIONS

Michael J Freedman, Kobbi Nissim, and Benny Pinkas. "Effcient private matching and set intersection." In International conference on the theory and applications of cryptographic techniques, pp. 1-19. Springer, 2004.

Arjun Narayan and Andreas Haeberlen. "{DJoin}: Differentially private join queries over distributed databases". In 10th USENIX Symposium on Operating Systems Design and Implementation (OSDI 12), pp. 149-162, 2012.

(Continued)

*Primary Examiner* — Edward Zee
(74) *Attorney, Agent, or Firm* — S. Scott Foster; Kowert, Hood, Munyon, Rankin & Goetzel, P.C.

(57) ABSTRACT

Computer systems and associated methods are disclosed to implement the non-interactive join of privacy-preserving dataset sketches. In some embodiments, an entity can publish a one-time sketch of their dataset that would enable another entity to join their data without exposing private information. The sketch can map, using a hash function, the identities associated with a first value of the dataset to a data structure, in some embodiments. A same or different entity can join the first sketch with a privacy-preserving second sketch of a second dataset that includes added noise, and can determine an estimate of a number of identities that correspond with specific values of the first and second datasets from the joined dataset. The sketch can be published just one time, and therefore does not require separate new private computations with privacy budgeting for each additional party when a join is desired, in some embodiments.

20 Claims, 20 Drawing Sheets

(56) References Cited

OTHER PUBLICATIONS

Prasad Buddhavarapu, Andrew Knox, Payman Mohassel, Shubho Sengupta, Erik Taubeneck, and Vlad Vlaskin. "Private matching for compute". Cryptology ePrint Archive, 2020, pp. 1-20.

Gayathri Garimella, Payman Mohassel, Mike Rosulek, Saeed Sadeghian, and Jaspal Singh. "Private set operations from oblivious switching." In IACR International Conference on Public-Key Cryptography, pp. 591-617. Springer, 2021.

Philippe Flajolet and G Nigel Martin. "Probabilistic counting algorithms for data base applications." Journal of computer and system sciences, 31(2): pp. 182-209, 1985.

Moses Charikar, Kevin Chen, and Martin Farach-Colton. "Finding frequent items in data streams," In International Colloquium on Automata, Languages, and Programming, pp. 693-703. Springer, 2002.

Graham Cormode and Shan Muthukrishnan. "An improved data stream summary: the count-min sketch and its applications," Journal of Algorithms, 55(1): pp. 58-75, 2005.

Noga Alon, Yossi Matias, and Mario Szegedy. "The space complexity of approximating the frequency moments," Journal of Computer and system sciences, 58(1):137-147, 1999.

Noga Alon, Phillip B Gibbons, Yossi Matias, and Mario Szegedy. "Tracking join and self-join sizes in limited storage," Journal of Computer and System Sciences, 64(3): pp. 719-747, 2002.

Luca Melis, George Danezis, and Emiliano De Cristofaro. "Effcient private statistics with succinct sketches," arXiv preprint arXiv:1508.06110, 2015, pp. 1-15.

Praneeth Vepakomma, Subha Nawer Pushpita, and Ramesh Raskar. "DAMS: Meta-estimation of private sketch data structures for differentially private covid-19 contact tracing," Technical report, Tech. Rep., 2021. Accessed: Jun. 30, 2022.[Online]. Available: https://www.academia.edu/download/79529169/DAMS_Vepakomma_et_al.pdf, 2021, pp. 1-10.

Cynthia Dwork, Frank McSherry, Kobbi Nissim, and Adam Smith. "Calibrating noise to sensitivity in private data analysis," In Shai Halevi and Tal Rabin, editors, Theory of Cryptography, pp. 265-284, Berlin, Heidelberg, 2006. Springer Berlin Heidelberg.

Stanley L Warner. "Randomized response: A survey technique for eliminating evasive answer bias," Journal of the American Statistical Association, 60(309): pp. 63-69, 1965.

Ulfar Erlingsson, Vasyl Pihur, and Aleksandra Korolova. "Rappor: Randomized aggregatable privacy-preserving ordinal response," In Proceedings of the 2014 ACM SIGSAC conference on computer and communications security, pp. 1054-1067, 2014.

Graham Cormode, Somesh Jha, Tejas Kulkarni, Ninghui Li, Divesh Srivastava, and Tianhao Wang. "Privacy at scale: Local differential privacy in practice," In Proceedings of the 2018 International Conference on Management of Data, pp. 1655-1658, 2018.

Vitaly Feldman and Kunal Talwar. "Lossless compression of effcient private local randomizers," In International Conference on Machine Learning, pp. 3208-3219. PMLR, 2021.

Hilal Asi, Vitaly Feldman, and Kunal Talwar. "Optimal algorithms for mean estimation under local differential privacy," arXiv preprint arXiv:2205.02466, 2022, pp. 1-27.

Andrew McGregor, Ilya Mironov, Toniann Pitassi, Omer Reingold, Kunal Talwar, and Salil Vadhan. T"he limits of two-party differential privacy," In 2010 IEEE 51st Annual Symposium on Foundations of Computer Science, pp. 81-90. IEEE, 2010.

Iftach Haitner, Noam Mazor, Jad Silbak, and Eliad Tsfadia. "On the complexity of two-party differential privacy," arXiv preprint arXiv:2108.07664, 2021, pp. 1-14.

\* cited by examiner

Global – One party has all the data

Party A

| Name | Salary | Health Condition + |
|---|---|---|
| Alice | 110K | 0 |
| Bob | 65K | 1 |
| Carol | 200K | 1 |
| David | 20K | 0 |

FIG. 7A

Local – Each party has its own data

Party A

| Name | Salary | Health Condition + |
|---|---|---|
| Alice | 110K | 0 |

Party B

| Name | Salary | Health Condition + |
|---|---|---|
| Bob | 65K | 1 |

Party C

| Name | Salary | Health Condition + |
|---|---|---|
| Carol | 200K | 1 |

Party D

| Name | Salary | Health Condition + |
|---|---|---|
| David | 20K | 0 |

FIG. 7B

Organizational Model

Party A

| Name | Salary |
|---|---|
| Alice | 110K |
| Bob | 65K |
| Carol | 200K |
| David | 20K |
| Emily | 70K |
| Frank | 30K |

Party B

| Name | Health Condition + |
|---|---|
| Alice | 0 |
| Bob | 1 |
| Carol | 1 |
| David | 0 |
| George | 1 |
| Helen | 0 |
| Ian | 0 |

FIG. 8

*Sketch of vaccinated people*

1202: | 1 | 0 | 0 | -3 | 0 |

1204: | 1 | 0 | 0 | -3 | 0 |   •   1206: | 1 | 1 | -2 | 0 | 0 |   = 1

1208: | 1 | 0 | 0 | -3 | 0 |   •   1210: | -1 | -2 | -1 | 0 | 1 |   = -1

*Sketch of unvaccinated people*

1212: | 1 | -1 | -2 | 0 | 0 |

1214: | 1 | -1 | -2 | 0 | 0 |   •   1216: | 1 | 1 | -2 | 0 | 0 |   = 4

1218: | 1 | -1 | -2 | 0 | 0 |   •   1220: | -1 | -2 | -1 | 0 | 1 |   = 3

1222: | 1 | 1 | -2 | 0 | 0 |

*Sketch of Health Condition - people*

1224: | -1 | -2 | -1 | 0 | 1 |

*Sketch of Health Condition + people*

*FIG. 12*

PRIVACY-PRESERVING DATASET SKETCHES THAT CAN BE JOINED NON-INTERACTIVELY

BACKGROUND

As remote storage and cloud computing services continue to mature, many enterprises, organizations, and end users are beginning to outsource their data to cloud-based database service providers for reliable maintenance, lower cost, and better performance. In recent years, a number of database systems in the cloud have been developed that offer high availability and flexibility at relatively low costs. However, despite their benefits, there are still a number of reasons that make many users to refrain from using these services. In particular, privacy concerns in cloud-based systems have become more and more important, especially for users with sensitive and valuable data. Many data owners and clients still do not fully trust cloud-based databases due to the fear that hackers or rogue administrators may compromise their data. As more data discoveries are made on the cloud, a new question arises—how can organizations combine their data with other organizations, while preserving privacy. One approach is interactive and cryptographic-based, e.g., secure function evaluation, however such schemes often require multiple interactions and can be computationally prohibitive.

BRIEF DESCRIPTION OF THE DRAWINGS

FIGS. 7A and 7B are examples of global and local approaches to differential privacy, according to some embodiments.

FIG. 8 is an example of an organizational-level model for differential privacy, with vertically partitioned data, according to some embodiments.

FIG. 12 illustrates a process for estimating a joint PDF for vaccinated/unvaccinated vs. a specific health condition "+" and "−" for two example database sketches, according to some embodiments.

Figure 1:
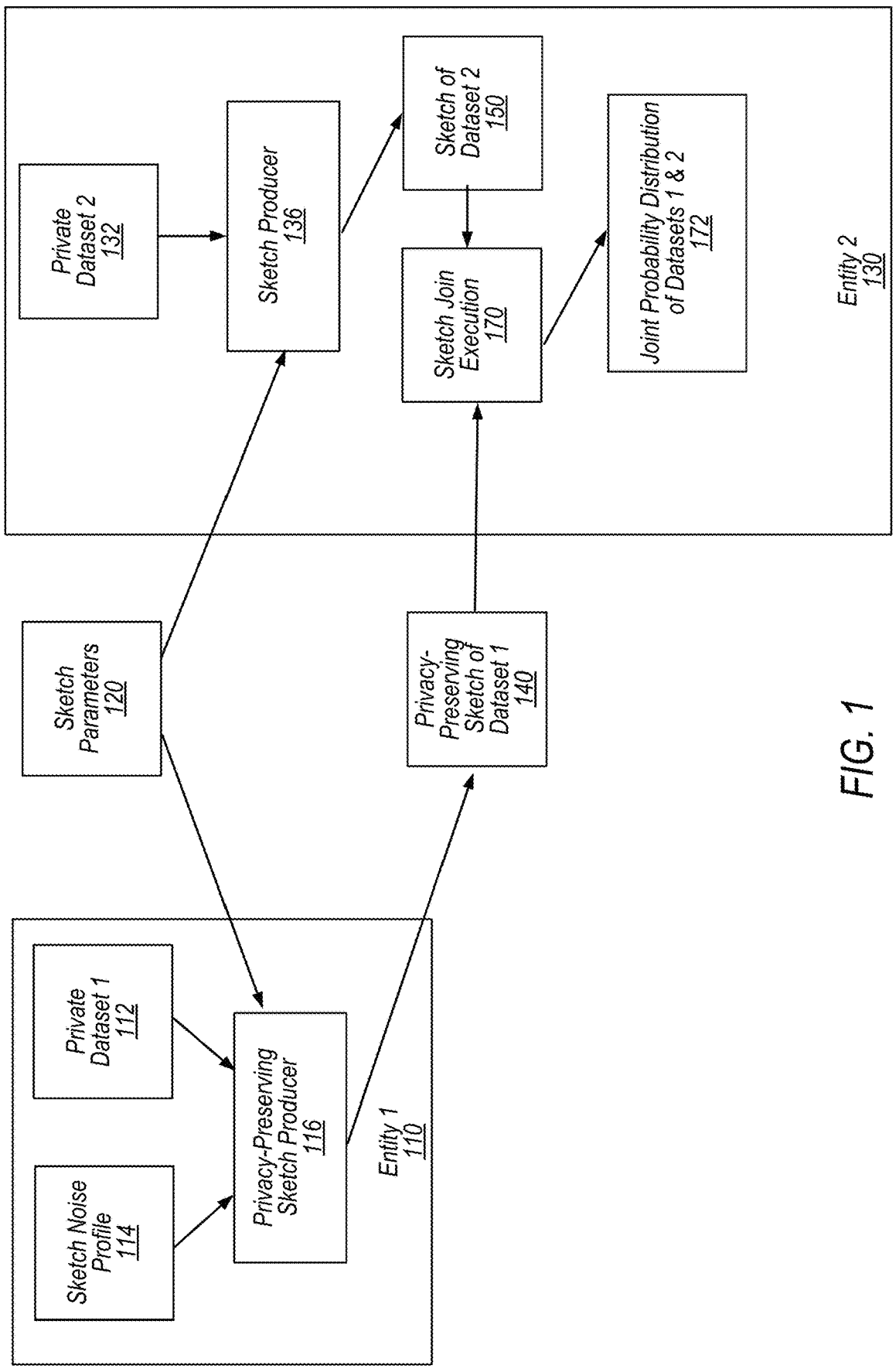
FIG. 1 is a logical block diagram illustrating an example system where one entity produces a privacy-preserving dataset sketch that is joined by a second entity to a sketch of its own dataset to produce a joint probability distribution of the joined datasets, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be used to implement privacy-preserving dataset sketches that can be joined non-interactively. In today's data management environment, different entities (such as organizations) hold datasets (such as databases) containing different private information about a common set of people. For example, two organizations might each have a dataset with private information about individuals which must remain within the organization. However, sometimes there is a column, or combination of columns, in both datasets that uniquely identifies each individual, such as name, email address, and/or social security number. For example, each dataset might have a name column specifying a person, and a value column giving some personal attribute. The systems and methods described herein describe ways for the entities or another entity (such as a third party) to learn about the combined datasets (e.g., email addresses that are present in both datasets) which could not be learned from either dataset alone. For example, among the email addresses that are common to both datasets, an entity could learn an estimate of the joint probability distribution function ("PDF"), or learn a function for predicting a value from one dataset based on values from the other.

The systems and methods described herein allow entities to publish a differentially private summary of their dataset, in some embodiments. In some embodiments, the summaries are joinable. For example, a third party might be able to take any two of the summaries, and combine them to get an approximate view of the join (e.g., using name field) of the two corresponding datasets. This can be done non-interactively, in some embodiments, where the organizations do not need to communicate with each other to publish their databases, except to agree on one common parameter (e.g, the dimension), and a random hash function to use.

Privacy-preserving dataset sketches that can be joined non-interactively allow entities to join their sensitive data with other entities while maintaining privacy of their users, in some embodiments. For example, a credit card organization and a hospital may wish to learn a joint function, e.g., predict a specific health condition's positivity from income, without disclosing to each other who is or is not in the dataset, who is +/− for the specific health condition, and/or who has what income. Privacy-preserving dataset sketches that can be joined non-interactively allow entities to combine their data with data from other entities. This can be expressed as "decorating my data" with columns from another institution. Continuing with the same example, a credit bureau may have gender, age, ethnicity and income while a hospital may have the status of the specific health condition. The systems and methods described herein allow entities to determine how accurately they can predict positivity of the specific health condition from credit bureau data.

One way to solve this problem of combining data with private data from other entities is with a trusted third party, i.e., the two parties agree to trust a third party to perform the computation for them. The term "Clean Room" is used by provider networks to describe digital rooms where parties can perform such joint computations. Entities provide their data to provider networks in the clear, together with the semantics of the columns, and the join column(s). The benefit of this approach is that exact answers can be given. However, this approach presumes a trusted third party and we would like to do away with this assumption. While companies do trust provider networks to store their data, it is a different question whether they trust a provider network to perform a joint computation of their data with another party's data. The reason is that trusted third parties are a single point of failure and open the data up to attack. A rogue employee performing the computation explicitly learns the semantics of the columns of both party's datasets and also learns what kinds of joint computations have business value.

Another way to solve this problem is with cryptographic protocols, such as Private Set Intersection. Indeed, cryptographic protocols are a result of a lack of trust in third parties. In these solutions, no third party exists. For each query to be answered in cryptographic protocols, parties engage in an interactive protocol, in which no information is revealed to either party except the answer to the query. Encrypted messages are exchanged over the interactive protocol. At the end of the protocol, each party learns the output of the joint computation and anything else that can be deduced from knowing the output of the joint function, but nothing more. The benefit of this approach is that it does not assume a trusted third party. However, secure function evaluation protocols can be slow. If such cryptographic solutions are sufficiently fast, they can be an ideal solution to the problem. One of their biggest strengths is that they produce exact answers. Nevertheless, cryptographic solutions do have limitations: they can be computationally prohibitive; each differentially private computation requires a separate cryptographic protocol and, hence, implies separate privacy budgeting; and the solutions must be interactive between parties that possess the private data to be joined.

The systems and methods described herein consider the setting where there is no trusted third party. Privacy-preserving dataset sketches that can be joined non-interactively allow entities to share sketches of privacy-sensitive datasets. The sketches can be joined with other datasets or each other on a shared identifier, such as email address or name, to do tasks involving columns from different customers, such as training a machine learning model or viewing an approximate joint distribution of column values. A party can publish a one-time sketch of their data that would enable another entity to join their data privately, in some embodiments. In some of these embodiments, each party can publish a one-time sketch that both preserves privacy and can be used by other parties to jointly estimate a PDF or learn a function.

These sketches are differentially private, allowing entities to share them while respecting individual privacy. They are also reusable and do not require interaction or sandboxing: once an entity has published a sketch, others can download it and re-use it freely, using either a provider network or their own hardware. No privacy budgeting is required, since privacy is built in to the sketch itself. This one-time publication also means that an interactive protocol is not necessary. These embodiments allow each party to compute the sketches, and allow other parties to make use of them. These embodiments make it possible to approximate a joint distribution/learn a joint function with sketches that preserve differential privacy.

There are several considerations for the sketches, in some embodiments. First, the two parties can agree on a column (or set of columns) that uniquely identify a common object or person, such as email address. Such a column can form the basis for a join between the two datasets. Second, the two parties can agree on a joint function they want to compute. In some embodiments, the joint function is a binary classifier where one party holds the features and the other party holds the labels. Other joint computations are possible such as a joint probability distribution, e.g., what is the distribution of positivity of a specific health condition by ethnicity. Next, the parties can agree on what it means for the computation to be performed privately, such as adhering to differential privacy. Intuitively, neither party gains any new knowledge of an individual's data, or even whether an individual is or is not in the other party's dataset. Finally, a synopsis can be constructed that simultaneously enables the desired joint computations and preserves differential privacy, in some embodiments.

Differential privacy is a type of privacy. Differential privacy can be partitioned into global and local approaches. In the global model, one party holds all of the data and this party computes noisy answers to queries or learns a noisy function. No joining is required. In the local model (e.g., randomized response), each party holds their own data. Again no joining is required since each party holds their data in their entirety. However, some embodiments of the privacy-preserving dataset sketches that can be joined non-interactively operate in an organizational-level model, i.e., vertically partitioned data. It operates in neither the global nor the local model. Each organization has its own data and the goal is to learn properties of a join.

When using privacy-preserving dataset sketches that can be joined non-interactively, entities first agree on the join key (e.g., an email address) and then generate a "noisy sketch" of their data. This sketch has the property that if any other party has the same join key, they can join their data with the noisy sketch. Continuing our example, if Party A with features joins their data with Party B that has +/− class labels, Party A will obtain a new dataset decorated with two new columns that represent a noisy positive and noisy negative label. The technical guarantee is that upon seeing the decorated columns, Party A will not gain any additional knowledge about whether an individual x is or is not in Party B's dataset, and also whether x has label "+" or "−".

Some embodiments of privacy-preserving dataset sketches that can be joined non-interactively are intended for a setting where two entities each have a dataset with private information about individuals which must remain within the organization. For example, neither organization may send even one record from their dataset to the other organization. There can be a column or combination of columns in both datasets which uniquely identifies each individual, such as name or name and address. In this setting, these embodiments allow entities or a third party to learn things about the combined datasets which could not be learned from either dataset alone: for example, a joint PDF or a joint learned function. To do this, one or both entities each generate data (which could take the form of a file) called a sketch which contains information about their dataset, in some embodiments. The sketches are generated in a differentially private way, in these embodiments, so it is safe for the organizations to share them with each other or publish them. Information about individuals is not revealed, including whether or not an individual is in either dataset, in these embodiments.

In some embodiments, each entity's dataset can have one or more identity columns, and zero or more value columns. The contents of the identity columns can uniquely identify an individual across the datasets of all entities who wish to join their data. Here are some sample rows from two example datasets:

| Party A - Credit Agency | | | |
|---|---|---|---|
| Identity columns | | Value columns | |
| Name | Date of birth | Income | Credit score |
| Alice Jones | 1986 Jan. 12 | 100,000 | 610 |
| Alice Jones | 1990 Apr. 22 | 40,000 | 800 |
| Bob Smith | 1968 Dec. 27 | 80,000 | 750 |
| ... | ... | ... | ... |

| Party B - Hospital | | |
|---|---|---|
| Identity columns | | Value column |
| Name | Date of birth | Health Condition test result |
| Alice Jones | 1990 Apr. 22 | + |
| Bob Smith | 1968 Dec. 27 | − |
| Carol Gu | 1975 May 30 | − |
| ... | ... | ... |

Here, since there are two identity columns "Name" and "Date of birth", it is okay that more than one person is named "Alice Jones", as long as they have different dates of birth. In this example, two of the value columns contained numerical values like 100,000, and another had categorical values "+" and "−". In general, for a value column to have categorical values means there's a set of possible values known ahead of time (in this case "+" and "−") and each value is from that set. When generating sketches, categorical and numerical values can be treated differently.

The benefit of the sketch is that it facilitates joint computations, in some embodiments. For example, it can be used to estimate a joint distribution and also learn a joint prediction function. Once the sketch is generated, it can be shared multiple times without any additional loss of privacy. Thus, no privacy budgeting is required. Furthermore, no interaction between parties is required. Once the sketch is published, other parties can do as they will. However, the benefits come at a cost of reduced accuracy. The benefits of privacy-preserving dataset sketches that can be joined non-interactively, when compared to third-party "clean rooms" and secure multi-party computation (e.g., cryptographic protocols) are as follows:

Trustless: Entities using clean rooms must trust a third party to keep their data safe. The other approaches shield customers' data even from third parties.

Reusable: Both clean rooms and secure multiparty computation require queries to be limited (e.g. through a privacy budget) in order to limit the amount one party can learn about the others' dataset. In contrast, a privacy-preserving dataset sketch can be published once and reused an arbitrary number of times.

Simple and non-interactive: Dataset sketches are simpler to use than multiparty computation: no cryptography or interactive protocol is required.

Flexible: Dataset sketches give entities flexibility: computations can even be run offline on their own hardware, avoiding the need to disclose their software or side datasets to the other entity or third parties.

Error: The main disadvantage to dataset sketches is that error rates are higher than with other approaches. For example, to compute set intersection size differentially privately via a secure function evaluation protocol, the standard deviation of the estimate is roughly $\sim 1/\varepsilon$ where $\varepsilon$ is the desired privacy. However, with a differentially private, sketch-based approach suggested in some embodiments of this application, the standard deviation of the set intersection size is $\sqrt{n}$ where n is the size of the dataset.

Use Case: Producing a Joint Distribution

Dataset sketches can be used for multiple applications, including to estimate a joint distribution (e.g., a joint PDF), and also to learn a joint prediction function. When computing a joint PDF, a goal can be to measure the number of individuals who have each combination of possible values across the two datasets. For example, if one dataset has test results for a specific health condition and the other has vaccination status, the goal can be to learn the approximate number of individuals with each of the four combinations of "+"/"−" for the specific health condition, and vaccinated/unvaccinated. There can be at least two ways to enable this. First, one entity could send a sketch of their dataset to the other, and that other entity could combine the sketch with their own dataset to produce the numbers. Alternatively, both entities could publish their sketches, and a third party could combine them to produce the numbers. Generally, the second way will have higher error, i.e. the approximation will be worse, since both parties would be introducing noise into their sketches.

For example, suppose a vaccine clinic knows who has been vaccinated for a specific health condition, and a hospital knows the specific health condition's status of some patients. A researcher would like to combine their data to understand vaccine effectiveness. This can be done as follows: The hospital publishes a sketch of the status of the specific health condition, or one can be reused from previously. The vaccine clinic publishes a sketch of vaccination status. The researcher downloads both sketches, and produces an approximate contingency table from them. This contingency table can be produced without revealing that any specific person is "+" for the health condition, or even that any specific person was tested at all. The contingency table is produced in a differentially private manner, i.e., the researcher cannot tell whether any specific person (e.g., John Doe) is or is not in the data.

Use Case: Learning a Function

When learning a function, the goal can be to learn how a value stored in Entity B's dataset can be predicted from values stored in Entity A's dataset. For example, B may have test results ("+" or "−") for the health condition, and A may have demographic information. The function can model how the demographic information affects likelihood of being affected by the health condition. In some embodiments, the function can take the form of a machine learning model, e.g., logistic regression. To enable this, Entity B would send a sketch of their dataset to Entity A, and Entity A would combine the sketch with their own demographic data to learn the function. In this case, Entity A doesn't produce a sketch. In some embodiments, this function can be learned in a manner that is differentially private, i.e., learn a function that can predict positivity of the health condition from income, but neither party can tell whether or not any specific person (e.g., John Doe) is in the other party's data.

For example, suppose a goal is to train a model to predict the specific health condition from income and other features. A hospital holds patients' status of the specific health condition, and a credit agency holds the features. Both datasets have a Person Name column. Not all credit agency users have hospital patient records, and vice versa. This can be done by the hospital publishing a sketch of the health condition's status by person name. The credit agency can use this sketch to train a model to predict the health condition's status from the credit agency's own features. If another entity also wants to train a model with their own features, or the credit agency later wants to train a new model with updated features, the same sketch can be re-used.

Embodiments of Privacy-Preserving Dataset Sketches that can be Joined Non-Interactively FIG. 1 is a logical block diagram illustrating an example system where a privacy-preserving sketch producer (116) of entity 1 (110) produces a privacy-preserving dataset sketch (140) of private dataset 1 (112) that is joined in a sketch join execution unit (170) by a entity 2 (130) to a sketch (150) of its own private dataset 2 (132) to produce a joint probability distribution of the joined datasets (172), according to some embodiments. FIG. 1 is an example where two entities, entity 1 (110) and entity 2 (130), each have a respective private dataset, private dataset 1 (112) and private dataset 2 (132), with private information about individuals which must remain within the entity. For example, neither entity may send even one record from their dataset to the other entity. However, there is a column or combination of columns in both datasets (112, 132) which uniquely identifies each individual, such as name or name and address. Therefore, the system of FIG. 1 allows Entity 2 (130) to learn things about the combined datasets which could not be learned from either dataset alone, using a joint probability distribution (172) of the datasets. To do this, both entities each generate a sketch which contains information about their dataset. Privacy-preserving sketch producer (116) of Entity 1 (110) takes private dataset 1 (112), a sketch noise profile (114), and shared sketch parameters (120) as input and produces a privacy-preserving sketch of dataset 1 (140). Sketch producer (136) of Entity 2 (130) takes private dataset 2 (132), and the shared sketch parameters (120) as input, and produces a sketch of dataset 2 (150). Privacy-preserving sketch of dataset 1 (140) is generated in a differentially private way, so it is safe for Entity 1 (110) to share it with Entity 2 (130), or to publish it. Information about individuals is not revealed, including whether or not an individual is in the dataset, in these embodiments.

The privacy-preserving sketch of dataset 1 (140) can be joined with other datasets on a shared identifier, such as email address or name, to do tasks involving columns from private dataset 2 (132) of entity 2 (130). In FIG. 1, the task is viewing an approximate joint distribution of column values with the joint probability distribution (172). Entity 1 (110) publishes a one-time sketch (140) of its data that enables Entity 2 (130) to join (170) a sketch (150) of its data privately. When computing the joint PDF (172), the goal to measure the number of individuals who have each combination of possible values across the two datasets.

Figure 2:
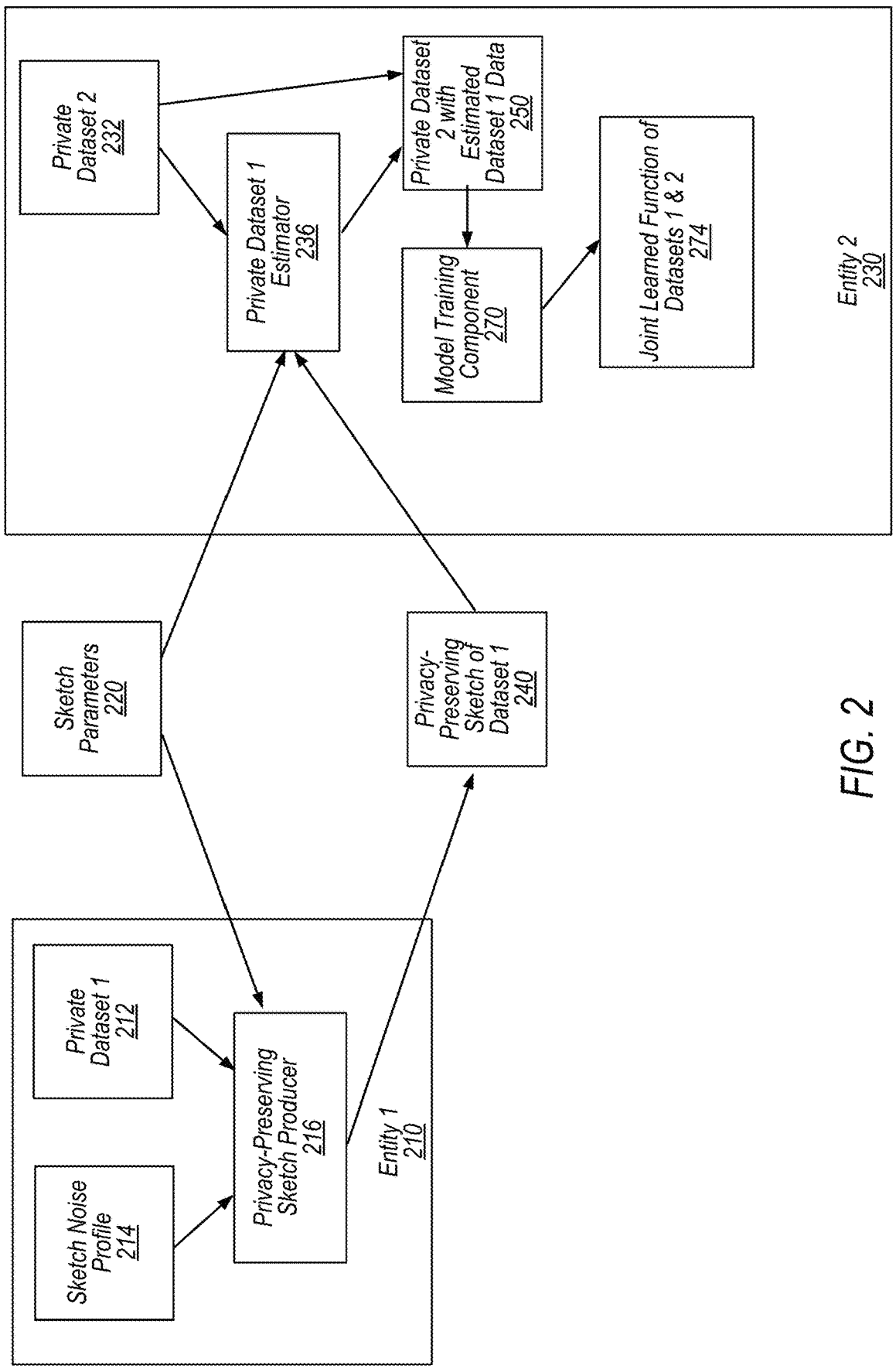
FIG. 2 is a logical block diagram illustrating an example system where one entity produces a privacy-preserving dataset sketch of a first dataset that is used by a second entity to estimate data in the first dataset for identities in its own dataset, in order to train a machine learning model that produces a joint learned function of the datasets, according to some embodiments.

FIG. 2 is a logical block diagram illustrating an example system where Entity 1 (210) produces a privacy-preserving dataset sketch (240) of private dataset 1 (212) that is used by Entity 2 (230) to estimate in a private dataset 1 estimator (236) data in the first dataset for identities in its own private dataset 2 (232), in order to train a machine learning model in a model training component (270) that produces a joint learned function of the datasets (274), according to some embodiments. FIG. 2 is an example where two entities, entity 1 (210) and entity 2 (230), each have a respective private dataset, private dataset 1 (212) and private dataset 2 (232), with private information about individuals which must remain within the entity. For example, neither entity may send even one record from their dataset to the other entity. However, there is a column or combination of columns in both datasets (212, 232) which uniquely identifies each individual, such as name or name and address. Therefore, the system of FIG. 2 allows Entity 2 (230) to learn things about the combined datasets which could not be learned from either dataset alone, using a joint learned function (274) of the datasets. To do this, Entity 1 (210) generates a sketch which contains information about their dataset, but Entity 2 (230) does not. Privacy-preserving sketch producer (216) of Entity 1 (210) takes private dataset 1 (212), a sketch noise profile (214), and shared sketch parameters (220) as input and produces a privacy-preserving sketch of dataset 1 (240). Private dataset 1 estimator (236) of Entity 2 (230) takes private dataset 2 (232), the shared sketch parameters (220) and the privacy-preserving sketch of dataset 1 (240) as input, and produces a private dataset 2 with estimated dataset 1 data (250). Privacy-preserving sketch of dataset 1 (240) is generated in a differentially private way, so it is safe for Entity 1 (210) to share it with Entity 2 (230), or to publish it. Information about individuals is not revealed, including whether or not an individual is in the dataset, in these embodiments.

The privacy-preserving sketch of dataset 1 (240) can be joined with other datasets on a shared identifier, such as email address or name, to do tasks involving columns from private dataset 2 (232) of entity 2 (230). In FIG. 2, the task is training a machine learning model in a model training component (270) that produces a joint learned function (274). Entity 1 (210) publishes a one-time sketch (240) of its data that enables Entity 2 (230) to join its data privately to produce private dataset 2 with estimated dataset 1 data (250) that is used by the model training component (270). When learning a function, the goal can be to learn how a value stored in Entity 1's private dataset (212) can be predicted from values stored in Entity 2's private dataset (232).

Figure 3:
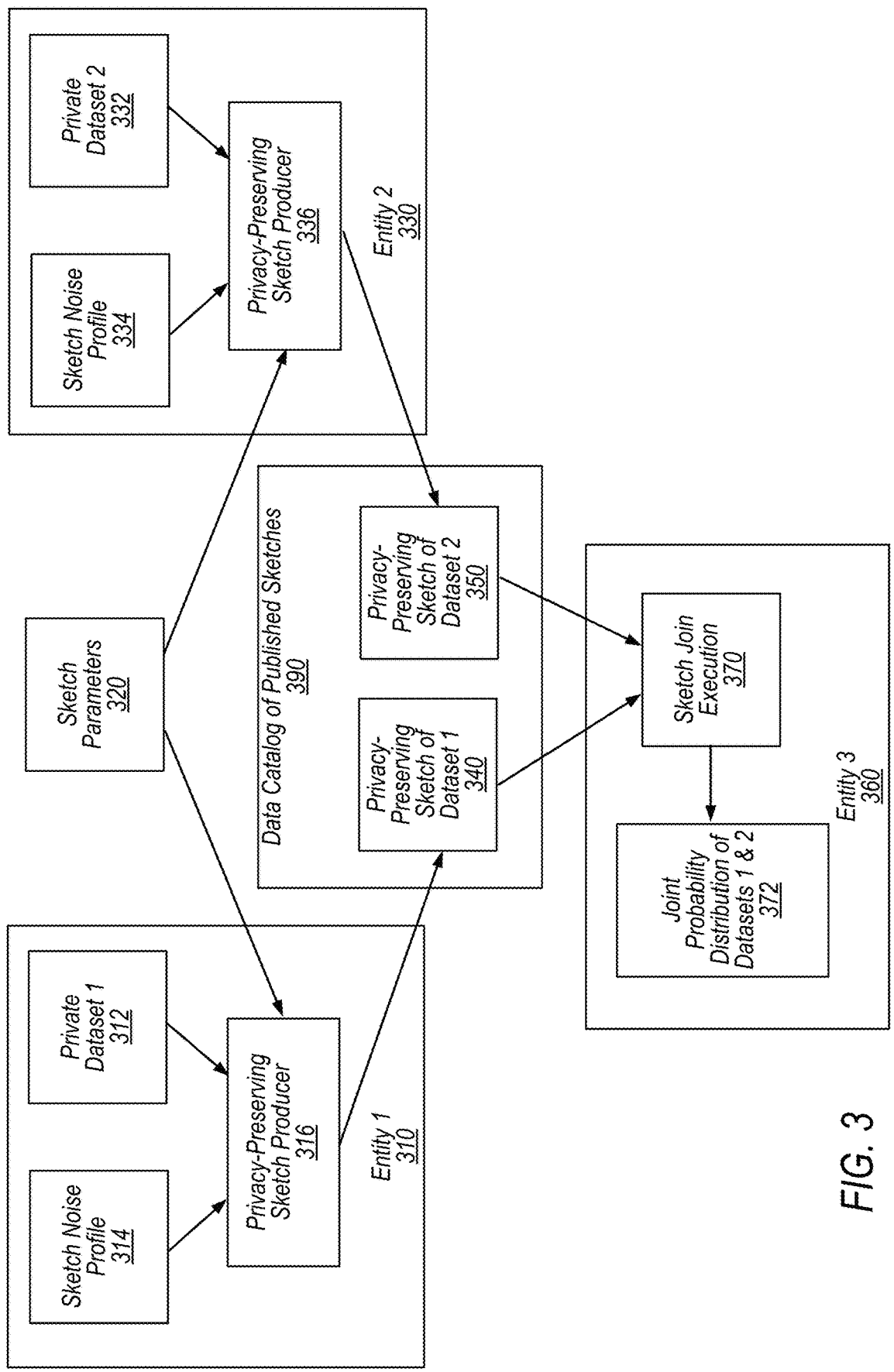
FIG. 3 is a logical block diagram illustrating an example system where two entities produce privacy-preserving dataset sketches of their respective datasets, where the dataset sketches are stored in a data catalog of published sketches, and where a third entities joins the privacy-preserving dataset sketches to produce a joint probability distribution of the datasets, according to some embodiments.

FIG. 3 is a logical block diagram illustrating an example system where two entities (310, 330) produce privacy-preserving dataset sketches (340, 350) of their respective datasets (312, 332), where the dataset sketches (340, 350) are stored in a data catalog of published sketches (390), and where a third entity (360) joins the privacy-preserving dataset sketches (340, 350) in a sketch join execution unit (370) to produce a joint probability distribution of the datasets (372), according to some embodiments. FIG. 3 is an example where two entities, entity 1 (310) and entity 2 (330), each have a respective private dataset, private dataset 1 (312) and private dataset 2 (332), with private information about individuals which must remain within the entity. For example, neither entity may send even one record from their dataset to the other entity. However, there is a column or combination of columns in both datasets (312, 332) which uniquely identifies each individual, such as name or name and address. Therefore, the system of FIG. 3 allows Entity 3 (360) to learn things about the combined datasets which could not be learned from either dataset alone, using a joint probability distribution (372) of the datasets. To do this, both entities each generate a sketch which contains information about their dataset. Privacy-preserving sketch producer (316) of Entity 1 (310) takes private dataset 1 (312), a sketch noise profile (314), and shared sketch parameters (320) as input and produces a privacy-preserving sketch of dataset 1 (340). Privacy-preserving sketch producer (336) of Entity 2 (330) takes private dataset 2 (332), a sketch noise profile (334), and the shared sketch parameters (320) as input, and produces a sketch of dataset 2 (350). Privacy-preserving sketch of dataset 1 (340) and privacy-preserving sketch of dataset 2 (350) is generated in a differentially private way, so it is safe for Entity 1 (310) and Entity 2 (330) to share it with Entity 3 (360), or to publish it in the data catalog of published sketches (390). Information about individuals is not revealed, including whether or not an individual is in the dataset, in these embodiments.

In FIG. 3, Entity 1 (310) and Entity 2 (330) publishes a one-time sketch that both preserves privacy and can be used by other parties, such as Entity 3 (360) to jointly estimate a PDF (372). The privacy-preserving sketch of dataset 1 (340) can be joined with the privacy preserving sketch of dataset 2 (250) a shared identifier, such as email address or name, that can be specified in the shared parameters (320) to do tasks involving columns from either or both private dataset 1 (312) or private dataset 2 (332). In FIG. 3, the task is viewing an approximate joint distribution of column values with the joint probability distribution (372). Entity 1 (310) publishes a one-time sketch (340) of its data. Entity 2 (330) publishes a one-time sketch (350) of its data. These sketches enable Entity 3 (360) to join the sketches in the sketch join execution unit (370). When computing the joint PDF (372), the goal can be measure the number of individuals who have each combination of possible values across the two datasets.

Figure 4:
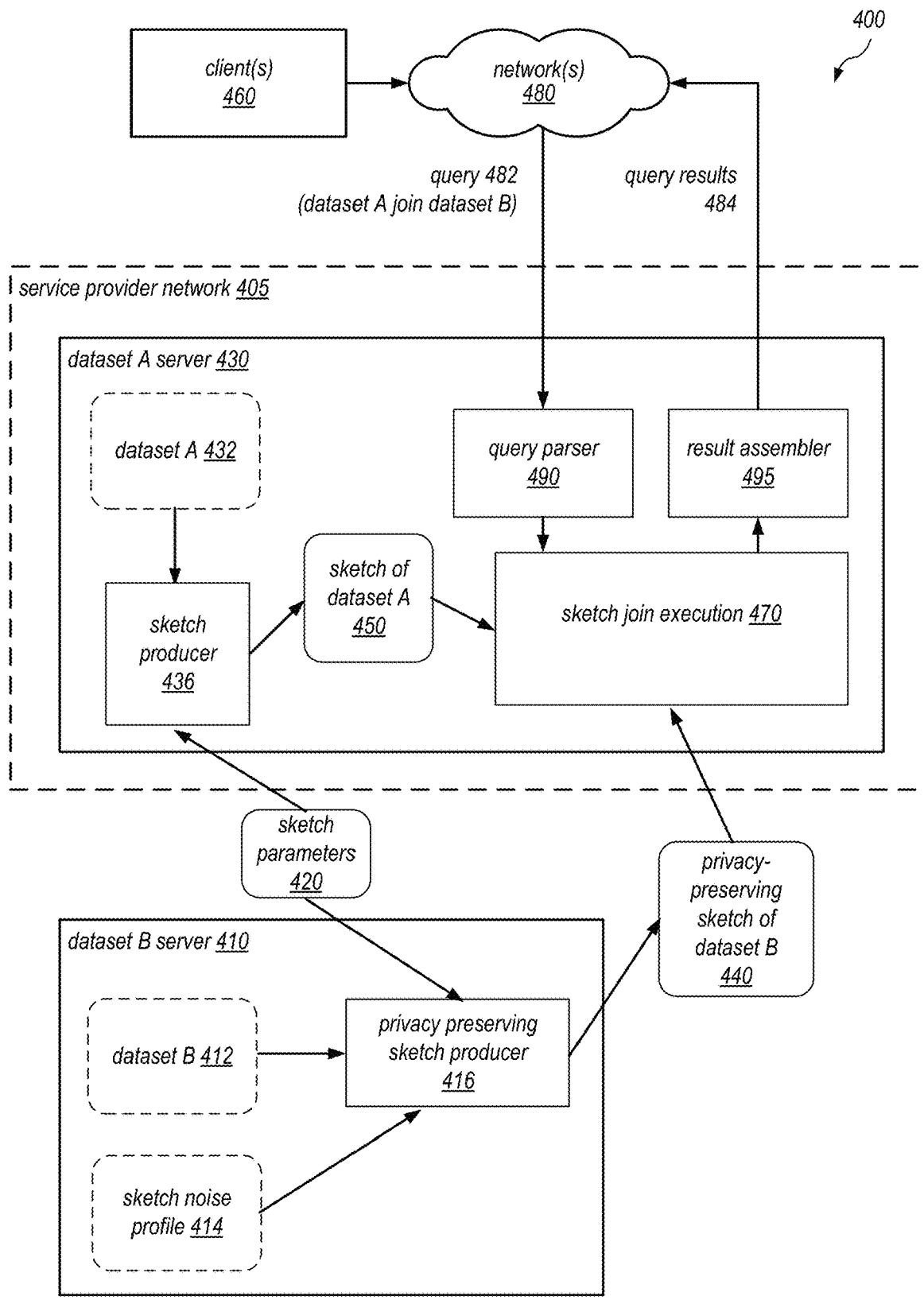
FIG. 4 is a logical block diagram illustrating an example system where a dataset A server receives a query from a client, produces a sketch of its own dataset, receives a privacy-preserving dataset sketch of another dataset that was produced by another server, joins the two datasets together, and responds to the query, according to some embodiments.

FIG. 4 is a logical block diagram illustrating an example system where a dataset A server (430) receives a query (482) from a client, produces a sketch (450) of its own dataset (432), receives a privacy-preserving dataset sketch (440) of another dataset (412) that was produced (416) by another server (410), joins the two datasets together in the sketch join execution unit (470), and responds to the query (484), according to some embodiments. As shown, the system 400 may include one or more clients 460, which communicates with a service provider network 405 over a network 480.

The service provider network 405 may provide computing resources via one or more computing services to the client(s) 460. The service provider network 405 may be operated by an entity to provide one or more services, such as various types of cloud-based computing or storage services, accessible via the Internet and/or other networks to client(s) 460. In some embodiments, the service provider network 405 may implement a web server, for example hosting an e-commerce website. Service provider network 405 may include numerous data centers hosting various resource pools, such as collections of physical and/or virtualized computer servers, storage devices, networking equipment and the like, needed to implement and distribute the infrastructure and services offered by the service provider network 405. In some embodiments, service provider network 405 may employ computing resources for its provided services. These computing resources may in some embodiments be offered to client(s) 460 in units called "instances," such as virtual compute instances.

The client(s) 460 may encompass any type of client configurable to submit requests to the service provider network 405. For example, a given client 460 may include a suitable version of a web browser or may include a plug-in module or other type of code module configured to execute as an extension to or within an execution environment provided by a web browser. Alternatively, a client 460 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 460 may be configured to generate network-based services requests according to a Representational State Transfer (REST)-style network-based services architecture, a document- or message-based network-based services architecture, or another suitable network-based services architecture. In some embodiments, the service provider network 405 may offer its services as web services, and the client(s) 460 may invoke the web services via published interfaces for the web services. In some embodiments, a client 460 (e.g., a computational client) may be configured to provide access to a computing service in a manner that is transparent to applications implemented on the client(s) 460 utilizing computational resources provided by the service provider network 405.

The client(s) 460 may convey network-based services requests to the service provider network 405 via network 480. In various embodiments, network 480 may encompass any suitable combination of networking hardware and protocols necessary to establish network-based communications between clients 460 and service provider network 405. For example, a network 480 may generally encompass the various telecommunications networks and service providers that collectively implement the Internet. A network 480 may also include private networks such as local area networks (LANs) or wide area networks (WANs) as well as public or private wireless networks. For example, both a client 460 and the service provider network 405 may be respectively provisioned within enterprises having their own internal networks. In such embodiments, the network 480 may include the hardware (e.g., modems, routers, switches, load balancers, proxy servers, etc.) and software (e.g., protocol stacks, accounting software, firewall/security software, etc.) necessary to establish a networking link between the client 460 and the Internet as well as between the Internet and service provider network 405. In some embodiments, client(s) 460 may communicate with service provider network 405 using a private network rather than the public Internet.

In some embodiments, the service provider network 405 may provide a database service or a data warehouse service. These services may employ one or more dataset servers 430, as shown. As discussed in some embodiments, the dataset servers 430 may be instances of virtual machines, which are hosted on physical hosts in the service provider network 405. In some embodiments, many servers 430 many be combined into a cluster, which may be used to support a distributed database system. In some embodiments, individual servers 430 may be added or removed to the database service on-demand, or automatically depending on a scaling policy. In this manner, the database service may be automatically scaled.

In some embodiments, the dataset service or server 430 may receive query requests 482, and responsively return query results 484. In some embodiments, the dataset server 430 may implement a relational database. In some embodiments, the query 482 may be specified in a Structured Query Language (SQL) request. In some embodiments, the query may specify the joining of two or more datasets, such as for examples dataset A (432) and dataset B (412), as shown. In some embodiments, the dataset service or server 430 may provide a variety of database management functions, such as the insertion, updating, and deletion of data in the database; the creation, deletion, and modification of database objects such as tables or indexes; and the loading of data via various data loading tools such as extract, transform, and load (ETL) tools.

In some embodiments, the dataset service or server 430 may be configured to maintain an encrypted database. For example, in some embodiments, the datasets in the database, such as dataset A 432 may be encrypted. Depending on the embodiment, the tables or other data set objects may be encrypted using different techniques. In some embodiments, the individual data items or attributes in the tables may be encrypted via an encryption scheme. In some embodiments, the database system or service may not decrypt the encrypted data in the encrypted tables, and the query results 484 may be returned in encrypted form. Depending on the embodiment, a variety of different security techniques may be employed to hide the data in the encrypted tables from unauthorized users. Depending on the embodiment, a variety of different encryption schemes may be used.

As shown, in some embodiments, the dataset service or server 430 may implement a query parser 490, a sketch join execution unit 470, and a result assembler 495. In some embodiments, some of these components may be implements as part of a larger querying handling subsystem of the database service. In some embodiments, the sketch join execution unit 470 may be part of a query engine implemented by the dataset service or server 430. In some embodiments, the query engine may implement a variety of querying functionalities of the dataset service or server 430.

In some embodiments, the query 482 may be provided to the query parser 490, which may parse the query in received form into a representation that may be used for processing by the query engine. In some embodiments, the query 482 may be received as a query token. In some embodiments, the query token may be encrypted or compressed. In some embodiments, the query token may specify the select columns of the query, one or more filter conditions, and one or more join conditions, among other things. In some embodiments, the query parser 490 may extract such information from the query token and translate this information into parameters that can be used by the query engine. For example, in some embodiments, the query parser 490 may translate columns (e.g., the join columns for datasets A and B) into column identifiers that can be used by the query engine to access the correct columns. In some embodiments, as shown, the query parser 490 may provide the column identifiers, for example, the join columns for datasets A and B, to the sketch join execution unit 470.

As shown, the dataset B server 410 may be tasked with producing (416) a privacy-preserving sketch of dataset B (440). Although the dataset B server 410 is not depicted in this example as belong to the same service provider network 405 as the dataset A server 430, in some embodiments, the dataset B server 410 may belong to the same service provider network or be operated or controlled by an entity or company that is the same as the database A server 430. In some embodiments, the dataset B server 410 may be part of a standalone service, which may be accessed via the public cloud to perform certain tasks.

FIG. 4 is an example where two entities, dataset B server (410) and dataset A server (430), each have a respective private dataset, private dataset B (412) and private dataset A (432), with private information about individuals which must remain within the entity. For example, neither entity may send even one record from their dataset to the other entity. However, there is a column or combination of columns in both datasets (412, 432) which uniquely identifies each individual, such as name or name and address. Therefore, the system of FIG. 4 allows Entity A (430) to learn things about the combined datasets which could not be learned from either dataset alone, using a joint probability distribution of the datasets. To do this, both entities each generate a sketch which contains information about their dataset. Privacy-preserving sketch producer (416) of dataset B server (410) takes private dataset B (412), a sketch noise profile (414), and shared sketch parameters (420) as input and produces a privacy-preserving sketch of dataset 1 (440). Sketch producer (436) of dataset A server (430) takes private dataset A (432), and the shared sketch parameters (420) as input, and produces a sketch of dataset A (450). Privacy-preserving sketch of dataset B (440) is generated in a differentially private way, so it is safe for dataset B server (410) to share it with dataset A server (430), or to publish it. Information about individuals is not revealed, including whether or not an individual is in the dataset, in these embodiments.

The privacy-preserving sketch of dataset B (440) can be joined with other datasets on a shared identifier, such as email address or name, to do tasks involving columns from private dataset A (432). In FIG. 4, the task can be assembling an approximate joint distribution of column values with the joint probability distribution. Dataset B server (410) publishes a one-time sketch (440) of its data that enables dataset A server (430) to join (470) a sketch (450) of its data privately. When computing the joint PDF, a goal can be measure the number of individuals who have all combination of possible values across the two datasets, in some embodiments.

As shown, in some embodiments, the sketch join execution unit 470 then returns results of the join to a results assembler 495. In some embodiments, combination of values across the two datasets that meet the join condition, are returned to the result assembler 495. In some embodiments, the result assembler may perform certain post processing tasks to prepare the result set to be returned as query results 484, or be further processes by downstream processing stages in the query engine, according to the query plan. For example, in some embodiments, the results assembler may format the select columns of the query or sort the query results according to some sort order. In some embodiments, the result assembler may prepare the resulting rows as intermediate results, so that they can be joined to the rows of another table.

Figure 5:
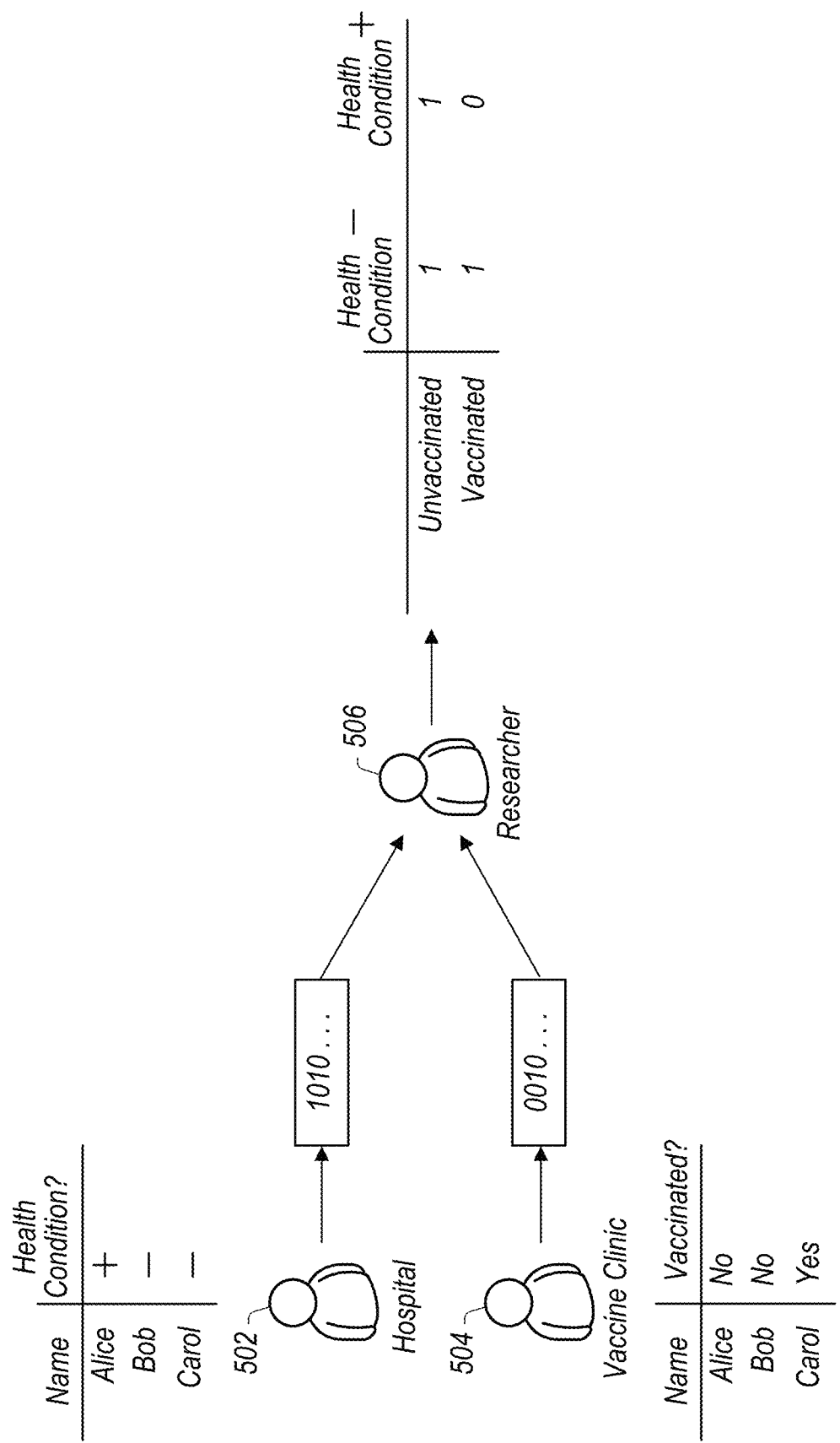
FIG. 5 details an example scenario where a vaccination site may have vaccination data, and a hospital may have test results for a specific health condition related to the vaccination, where a researcher determines a joint probability distribution from the data.

FIG. 5 details an example scenario where a vaccination site may have vaccination data related to a specific health condition, and a hospital may have test results of the specific health condition, where a researcher determines a joint probability distribution from the data. In FIG. 5, a vaccination site 504 may have vaccination data, and a hospital 502 may have test results for the health condition. A researcher 506 may want the joint PDF: among those present in both datasets, what is the distribution over the four outcomes (vaccinated, not vaccinated) vs. ("Health Condition +", "Health Condition –"). The researcher 506 is able to estimate this joint PDF without revealing that Alice is positive for the health condition, or even that Alice was tested. The researcher is able to do so in a differentially private manner, i.e., the researcher cannot tell whether Bob is or is not in the data.

Figure 6:
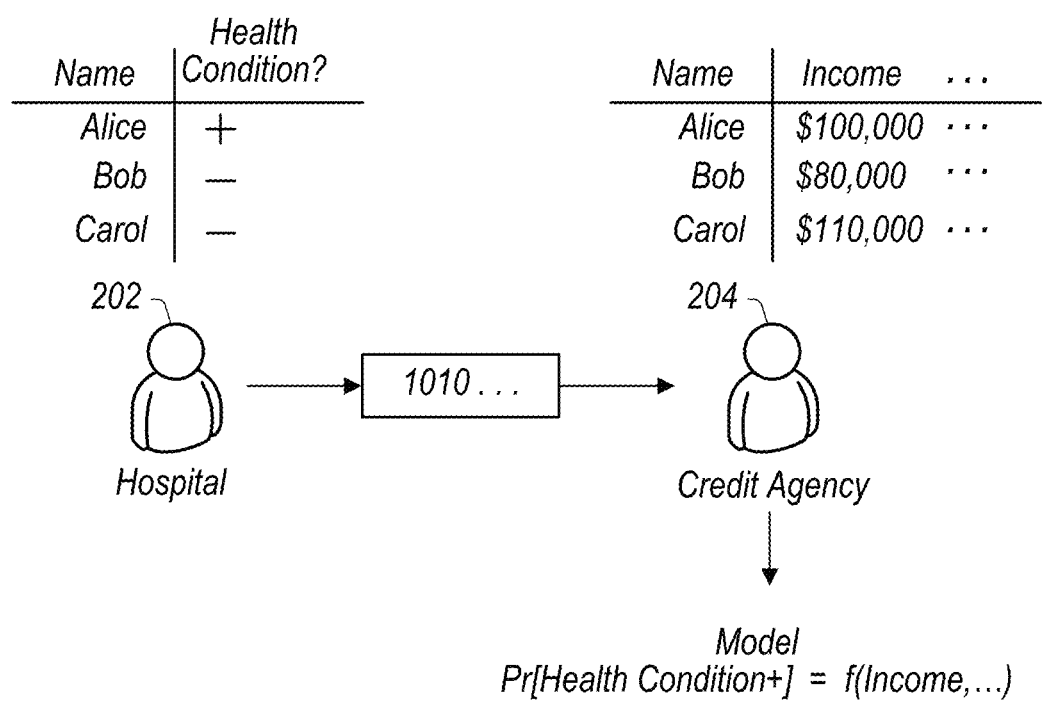
FIG. 6 details an example scenario where A hospital may want to join their clinical records with a credit bureau in order to predict positivity of a specific health condition from income or other information held by the credit bureau, according to some embodiments.

FIG. 6 details an example scenario where a hospital may want to join their clinical records with a credit bureau in order to predict positivity of a specific health condition from income or other information held by the credit bureau, according to some embodiments. In FIG. 6, a hospital 202 wants to join their clinical records with a credit bureau 204 in order to predict positivity of the specific health condition from income, ethnicity, credit score, etc. The credit agency is able to learn the function Pr["Health Condition+"]=$f$ (Income, . . . ) in a manner that is differentially private, i.e., learn a function $f$ that can predict positivity of the specific health condition from income, but neither party can tell whether or not Bob is in the other party's data.

FIGS. 7A and 7B are examples of global and local approaches to differential privacy, according to some embodiments. Differential privacy is a type of privacy. Differential privacy can be partitioned into global and local approaches. In the global model shown in FIG. 7A, one party, Party A, holds all of the data and this party computes noisy answers to queries or learns a noisy function. No joining is required. In the local model (e.g., randomized response) shown in FIG. 7B, each party holds their own data. Again, no joining is required since each party holds their data in their entirety.

FIG. 8 is an example of an organizational-level model for differential privacy, with vertically partitioned data, according to some embodiments. Some embodiments of the privacy-preserving dataset sketches that can be joined non-interactively operate in an organizational-level model, i.e., vertically partitioned data. It operates in neither the global nor the local model. Each organization has its own data and the goal is to learn properties of a join. For example, party A has salary information for a group of identities (i.e., persons), and party B has the specific health condition positivity data for different group of identities (i.e., persons), where some of the identities overlap between party A and party B. In this approach, when the data is joined, the identities of the individuals who do and do not contribute to the join is not revealed.

The Two-Sided Geometric Distribution

Some embodiments make use of a probability distribution called the two-sided geometric distribution. For any number $\alpha$ between 0 and 1, the two-sided geometric distribution with parameter a is a probability distribution over the integers, defined by the probability mass function $$p(x) = \frac{1-a}{1+a}a^{|x|}.$$

Below is one way to generate a sample from the two-sided geometric distribution with parameter, according to some embodiments:
  Generate two independent samples a, b from the geometric distribution with success probability 1-a with support the nonnegative integers.
  Return a-b.
Some embodiments can add noise sampled from a two-sided geometric distribution for the purpose of differential privacy.

Preparation of the Data

In some embodiments, the sketches depend on the following shared parameters. If multiple parties generate sketches, they can agree on these parameters in advance. The parameters can be published along with each sketch, since they are needed to interpret the sketches.
  A positive integer d
  A function h (called the hash function) which maps identities to integers from 1 to d. For example, if d=4 and there is one identity column containing names represented as a text strings, h might map the string "Alice" to 2 and the string "Bob" to 4.
    Note that for this and the other functions described, the set of identities in the datasets doesn't need to be known in advance in order to specify the function h.
  A function s (called the sign function) which maps identities to −1 or +1. This is similar to a hash function, except that the output is +1 or −1 instead of an integer from 1 to d. For example, s might map "Alice" to +1 and "Bob" to −1.
The section "Choosing Parameters" below gives advice on choosing these parameters.

Per-Sketch Parameters

In addition to the parameters described above, an organization can also choose a privacy parameter for that sketch when they generate a sketch, in some embodiments. The privacy parameter can be denoted as $\epsilon$. It must be a positive number. A larger choice of $\epsilon$ can result in more accurate results. A smaller choice of $\epsilon$ results in better privacy for the members of the dataset. Specifically, sketches generated using this technique can be $\epsilon$-differentially private. If the value column being sketched has numerical (rather than categorical) values, the organization can also choose a sequence of numerical boundaries in order to partition the range of numerical values into ranges, in some embodiments. The first range can be everything strictly less than the first boundary, the last range can be everything greater than or equal to the last boundary, and between each pair of consecutive boundaries, there can be a range of numbers which is at least the first boundary and less than the second. For example, if the column contains ages, the organization might choose boundaries 8, 15, 30, 60, meaning the ages are divided into the ranges (under 8), (at least 8 but less than 15), (at least 15 but less than 30), (at least 30 but less than 60), and (at least 60). The sequence of numerical boundaries (in this case, 8, 15, 30, 60) should be included with the sketch.

The choice of numerical boundaries is at the discretion of the entity, in some embodiments. One way to choose them is to use equally-spaced quantiles of the dataset: for example, to produce three ranges, the 0.25. 0.5 and 0.75 quantiles could be used. If this method is used, then publishing these boundaries might violate differential privacy, since quantiles might not not differentially private. Another option can be to use a differentially private method to approximate the quantiles.

Therefore, there can be two kinds of parameters. Parameters described in the "Preparation of the Data" section above must be agreed upon by all parties ahead of time, and published along with each sketch. The per-sketch parameter described in this section can be chosen just before the sketch is generated, and requires no agreement from other parties. If numerical boundaries are used, they can be published along with the sketch.

Generating a Sketch

Figure 9:
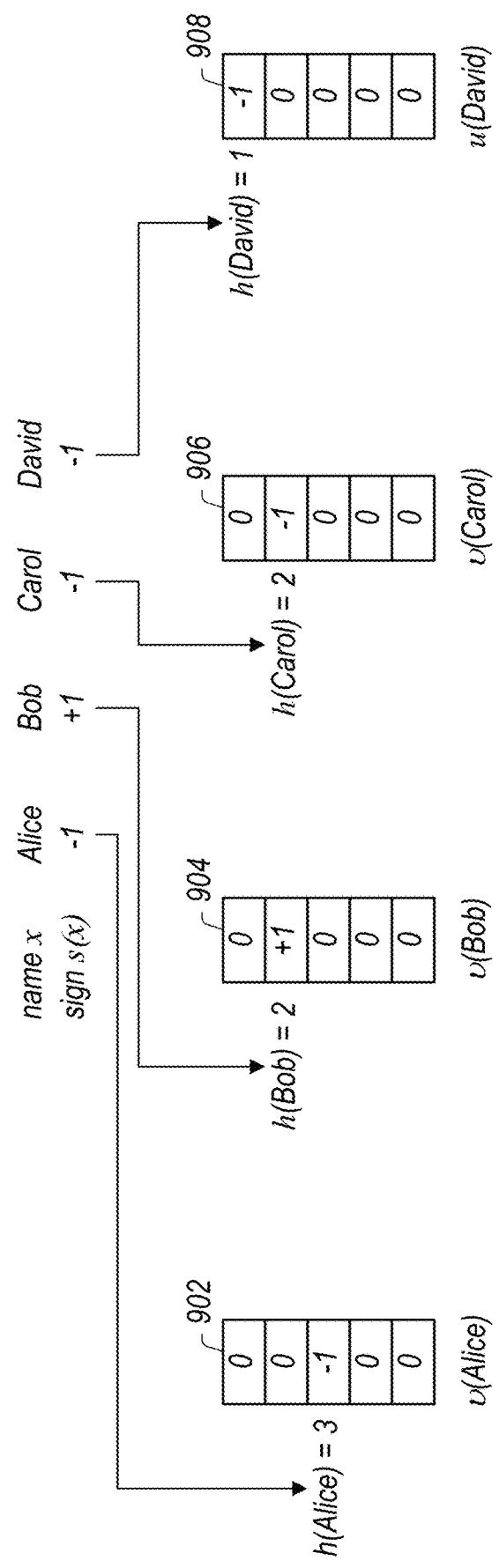
FIG. 9 depicts an example of computing a hash vector for identities in a dataset, according to some embodiments.

Some embodiments generate a sketch of a dataset with one value column. A method to generate such a sketch is described below. If a dataset has more than one value column, this method can be applied separately on each value column. First, in these embodiments, a special vector is computed for each identity called that identity's hash vector. For the purpose of illustration, the hash vector of an identity x can be denoted v(x). For example, if the database has two identity columns storing name and date of birth, then one identity x in the database might be (Alice Jones, 1990-04-22). To generate v(x), first h(x) and s(x) can be computed using the h and s functions chosen ahead of time (see section "Preparation of the Data" above). A vector of d numbers can be initialized to be all zeros. (d is another parameter described in the "Preparation of the Data" section.) Then, the value at position h(x) can be replaced in the vector with s(x). FIG. 9 depicts an example of computing a hash vector for identities in a dataset, according to some embodiments. FIG. 9 shows an example of four hash vectors (902, 904, 906, 908). For this illustration, d=5, h(Alice)=3 and s(Alice)=−1. The hash vector of Alice is v(Alice)=(0, 0, "negative 1", 0, 0), for example. The other individuals are computed similarly.

Next, how to generate a sketch of a set of identities is described, according to some embodiments. For example, if there's one identity column containing strings, a set of identities might be {Alice, Bob, David}. Generating a sketch of a set is a step toward a goal of generating a sketch of a dataset. To generate a sketch of a set of identities, first compute the hash vector v(x) for each identity x in the set, as just explained. Then, take d independent samples from a two-sided geometric distribution with parameter a set to $e^{-\epsilon}$, and create a vector with those d values, which can be called the "noise" vector. Then, the sketch is the vector sum of all the identities v(x) together with the noise vector.

Figure 10:
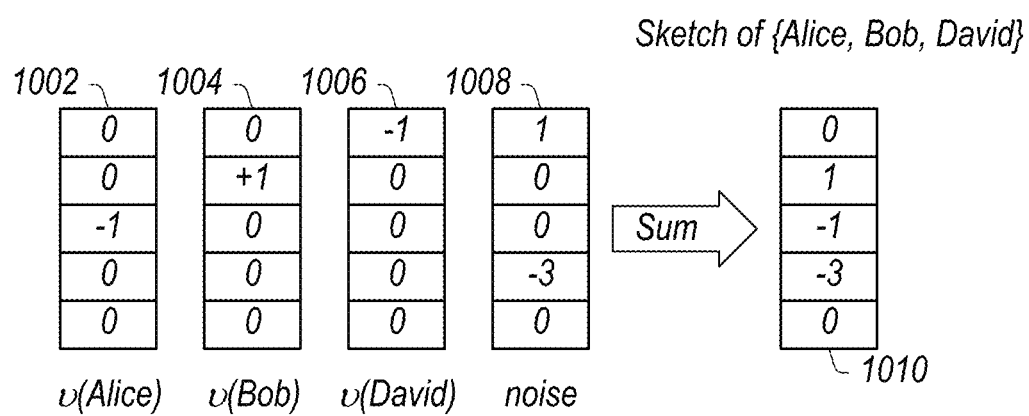
FIG. 10 illustrates the process of generating a sketch of a set with identities, using the hash vectors of the identities and a vector of added noise, according to some embodiments.

FIG. 10 illustrates the process of generating a sketch of a set with identities, using the hash vectors of the identities and a vector of added noise, according to some embodiments. FIG. 10 illustrates the process of generating a sketch of the set with identities "Alice", "Bob", "David". The hash vectors v(x) (1002, 1004, 1006) are taken from the previous figure. In this example, the noise vector (1008) is (1, 0, 0, −3, 0). Adding the hash vectors of Alice (1002), Bob (1004), and David (1006) together with the noise vector (1008) produces the sketch vector (0, 1, −1, −3, 0) in item 1010.

Some embodiments can generate a set of a dataset if the values are categorical. As a running example, suppose the value column records vaccination status, and the possible values are "Yes" and "No". An order for the possible values in the column can be chosen. This order can be published along with the sketch. In this example, the order "Yes", "No" can be chosen. To generate this sketch, for each possible value, a sketch of the set of identities of rows in the database that have that value can be generated. Then, the sketches for the different values can be concatenated into a matrix, with one column for each possible value, in the order just chosen, according to some embodiments. The matrix might have d rows because each set sketch had d rows. As an example, consider the dataset:

| Name | Vaccinated? |
|---|---|
| Alice | Yes |
| Bob | Yes |
| Carol | No |
| David | Yes |

Figure 11:
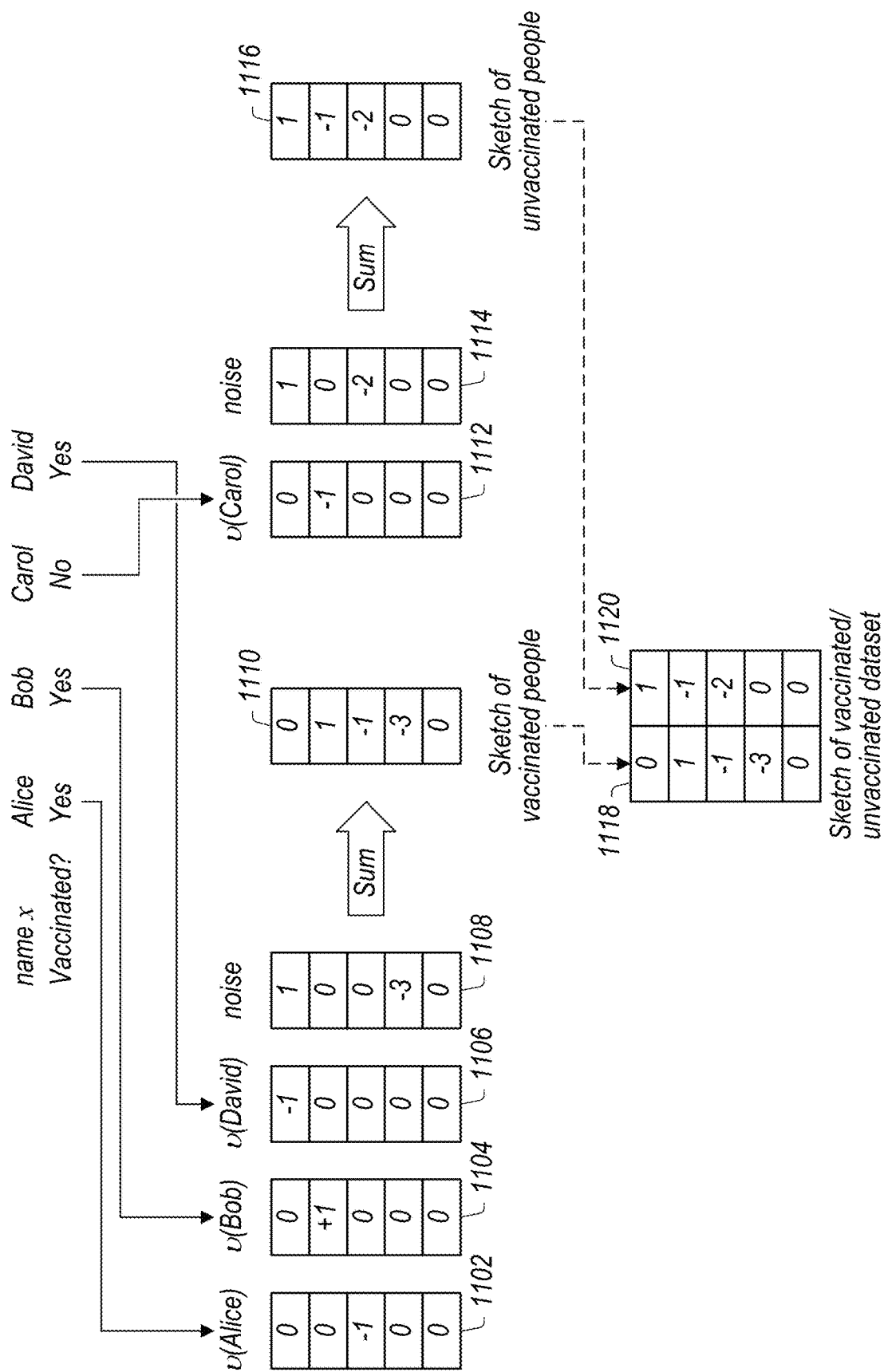
FIG. 11 illustrates the process of generating a sketch of a dataset, where a sketch of the set of people with one value, and a sketch the set of people with a different value are generated, and the two sketches are concatenated into a matrix, according to some embodiments.

FIG. 11 illustrates the process of generating a sketch of a dataset, where a sketch of the set of people with one value, and a sketch the set of people with a different value are generated, and the two sketches are concatenated into a matrix, according to some embodiments. FIG. 11 illustrates the process of generating a sketch of this dataset previously described, in particular. First, sketches of the set of people with value "Yes" (1110) (that is, {Alice, Bob, David}) and the set of people with value "No" (1116) ({Carol}) are generated, as in the previous figure. The sketch of the set of people with value "Yes" (1110) is produced from hash vectors v(x) (1102, 1104, 1106) and the noise vector (1108). The sketch of the set of people with value "No" (1116) is produced from hash vector v(x) (1112) and the noise vector (1114). Then, the two sketches are concatenated into a matrix (1120) with d=5 rows and two columns.

A sketch of a dataset if the values are categorical can also be generated, according to some embodiments. First, as described in the section "Per-Sketch Parameters", an entity can choose a sequence of numerical boundaries. Then, they can replace each value with its range. For example, suppose this is the dataset:

| Name | Age |
|---|---|
| Alice | 9 |
| Bob | 32 |
| Carol | 18 |
| David | 10 |

If the numerical boundaries chosen were 8, 15, 30, 60, then the dataset becomes:

| Name | Age |
|---|---|
| Alice | 8-15 |
| Bob | 30-60 |
| Carol | 15-30 |
| David | 8-15 |

Now, in this example, the "Age" column may be considered to have categorical values, with five possible values (−8, 8−15, 15−30, 30−60, 60−). The method for generating a sketch of categorical values can be applied. In this case, instead of the possible values "Yes" and "No" as illustrated in the previous diagram, there would be five categories, and so the sketch would be the concatenation of five set sketches, instead of the two shown in the previous diagram, according to some embodiments.

Estimating a Joint PDF

In this section, estimating the joint distribution of two datasets is described, according to some embodiments. In other words, estimating a contingency matrix of the possible combinations of values. It can be assumed that a sketch of each of the two datasets already exists. For example, suppose dataset A's value column is vaccination status, with possible values "Yes" and "No", and dataset B's value column is test results for a specific health condition, with possible values "+" and "−". With d=5, the sketch of database A might look like:

| | |
|---|---|
| 1 | 1 |
| 0 | −1 |
| 0 | −2 |
| −3 | 0 |
| 0 | 0 | with the columns corresponding to "Yes" and "No" respectively; and the sketch of database B might look like:

| | |
|---|---|
| 1 | −1 |
| 1 | −2 |
| −2 | −1 |
| 0 | 0 |
| 0 | 1 | with the columns corresponding to "−" and "+" respectively.

To estimate the number of people who have a value of $v_A$ in database A and a value of $v_B$ in database B, the dot product of the column from database A's sketch corresponding to $v_A$ can be taken with the column from database B's sketch corresponding to $v_B$, according to some embodiments. The value of that dot product can serve as an estimate of the answer. Furthermore, if the hash function h and sign function s are chosen according to the recommendations below under "Choosing parameters", then there can be two mathematical guarantees, according to some embodiments:

The expected value of this dot product exactly equals the number of people with value $v_A$ in database A and value $v_B$ in database B, where the expectation is taken over the random choice of hash function h and sign function s.

The variance of the dot product is equal to $$\frac{n_A n_B - n_{AB}}{d} + \frac{2n_a}{\epsilon_B^2} + \frac{2n_b}{\epsilon_A^2} + \frac{4d}{\epsilon_A^2 \epsilon_B^2}$$

where $n_A$ and $n_B$ are the number of people with value $v_A$ in database A and with value $v_B$ in database B respectively, $n_{AB}$ is the number of people with both (value $v_A$ in database A and $v_B$ in database B), $\epsilon_A$ and $\epsilon_B$ are the values of the per-sketch parameter $\epsilon$ used to generate the sketches for database A and B respectively, and d is the agreed-upon parameter (described in section "Preparation"). The variance can be a statistical measure of how a random value tends to vary from its expected value.

FIG. 12 illustrates a process for estimating a joint PDF for vaccinated/unvaccinated vs. "+" and "−" for a specific health condition, for two example database sketches, according to some embodiments. FIG. 12 illustrates the estimation of a joint PDF for vaccinated/unvaccinated vs. the specific health condition "+" and "−" for the two example database sketches given above. For example, the estimate of the number of people who are vaccinated and do not have the specific health condition is obtained by taking the dot product of (1, 0, 0, −3, 0) (the 1202 sketch of the set of vaccinated people) with (1, 1, −2, 0, 0) (the 1222 sketch of the set of health condition—people), which is equal to 1. The dot product of 1204 (which is 1202) and 1206 (which is 1222) is 1. Note that the values can be negative; for example, the estimated number of vaccinated health condition positive people estimated in FIG. 12 is −1. This does not mean that the true number of health condition positive vaccinated people was negative. Of course, that's impossible. But due to the error introduced by this technique, inaccurate answers, including negative numbers, are possible.

As a variation on this, the joint PDF may be computed by one of the two entities holding the datasets instead of by a third party, according to some embodiments. For example, suppose entity A holds the vaccinated/unvaccinated dataset, entity B holds the +/− dataset of the specific health condition, and entity A wishes to compute the joint PDF. In these embodiments, there is no need for the organization doing the computation (entity A in the example) to share a sketch of their dataset with anyone else. Because of that, there is no need for entity A to add noise to their sketch. The purpose of the noise was to preserve privacy for sketches intended to be shared. So, the "noise" vector can be omitted from the sum used to compute the sketch of a set (as described in the section "Generating a sketch" above). As a result, the output will have a lower variance, i.e., error will tend to be lower.

Learning a Joint Function

In this section, how to learn a function for predicting a value (the "label") stored in one organization's dataset based on the values (the "features") stored in another organization's dataset is described. The learning can be done by the first entity, i.e., the entity that holds the features. The other entity can provide a sketch of their dataset. As an example, suppose entity A's dataset is:

| Identity Column | Value columns | |
|---|---|---|
| Name | Income | Age |
| Alice | 100000 | 65 |
| Bob | 80000 | 44 |
| Carol | 40000 | 41 |
| David | 60000 | 50 | and entity B's dataset is:

| Identity Column | Value column |
|---|---|
| Name | Health Condition Test Result |
| Bob | − |
| Carol | + |
| David | − |
| Emily | + |

For each possible label (− and + in this example), the corresponding label vector can be defined to be a vector where one coordinate is 1 and the others are 0, and the position of the 1 coordinate corresponds to the value, according to some embodiments. For example, suppose the order for these values is −, +. Recall under "Generating a sketch" that an order for the possible values is published along with the sketch. Then the label vector for "−" is (1, 0), and the label vector for "+" is (0, 1). As a separate example, if the possible label values were North, South, East, West in that order, then the label vector for East would be (0, 0, 1, 0). The organization with the labels (entity B) can generate a sketch $S(D_B)$ of their dataset (section "Generating a sketch" above). We'll call this the label sketch. For example, $S(D_B)$ might look like this:

| | |
|---|---|
| 1 | −1 |
| 1 | −2 |
| −2 | −1 |
| 0 | 0 |
| 0 | 1 | with the columns corresponding to "−" and "+" respectively since the order of values was −, +. We'll denote the label sketch by S, and its $i^{th}$ column by $S_i$, so in this example $S_2$ is (−1, −2, −1, 0, 1). Let k be the number of columns (equal to the number of possible labels), which is 2 in this example. Entity B can send this sketch $S(D_B)$ to the organization with the features (e.g., entity A).

Figure 13:
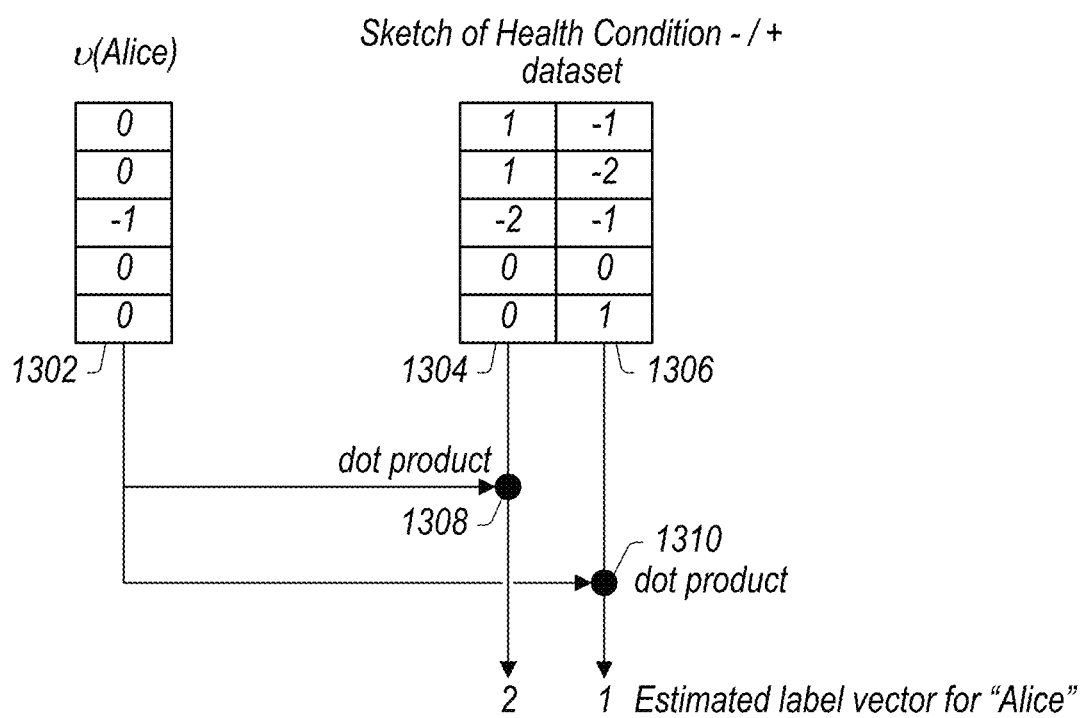
FIG. 13 illustrates a process of estimating a label vector for an identity in a dataset by taking the dot product of the hash vector of the identity with each column of a privacy-producing sketch of a different dataset that contains the labels, according to some embodiments.

Now, how entity A can estimate the label vector for any identity is described, according to some embodiments. Entity A can use the sketch $S(D_B)$ received from Entity B to produce a version of their dataset $D_{synth}$ which includes an estimated label column added, according to some embodiments. FIG. 13 illustrates a process of estimating a label vector for an identity in a dataset by taking the dot product of the hash vector of the identity with each column of a privacy-producing sketch of a different dataset that contains the labels, according to some embodiments. Given an identity (say, "Alice"), that identity's hash vector (v(Alice)) (1302) can be computed. Then the dot product of that hash vector (1302) with each column of the label sketch (1304, 1306) can be taken by entity A. The sequence of dot product values (1308, 1310) can be the estimate of the label vector. FIG. 13 shows an example where the identity is "Alice", v(Alice) (1302) is (0, 0, −1, 0, 0), and the label sketch is as in the example above. Taking the dot product (1308, 1310) of v(Alice) (1302) with each column of the label sketch (1304, 1306) produces the vector (2, 1), which is an estimate of the label vector for Alice. If the first coordinate is bigger than the second, A assigns the label 1 to the row and includes it in $D_{synth}$. If the second coordinate is bigger, A assigns the label 2 and includes it in $D_{synth}$. If the coordinates are equal, A does not include the row in $D_{synth}$.

If the hash function h and sign function s are chosen as described in the section "Choosing parameters", then the expected value (randomness taken over the choice of h and s) of the estimated label vector is equal to the actual label vector, or a vector of all coordinates 0 if the identity is not present in the label dataset, according to some embodiments. Note that (2, 1) could not possibly be the true label vector, since (in this example) the possible label vectors are (1, 0) and (0, 1). In general, the estimated label vectors will tend to have impossible values like this, because of errors introduced by the technique, use can still be made of them.

A loss function takes as input the estimated label vectors, and predictions for those values, and outputs a number estimating how much the predictions deviate from the estimated labels, according to some embodiments. A loss function is a concept in machine learning, and there are many to choose from. Implementations are free to choose any loss function, so long as it receives the true labels via label vectors, and so long as the function can still be computed when the label vector has impossible values like (2, 1). A logistic loss function can be used, as an example. Let $(x_1, y_1), (x_2, y_2), \ldots, (x_n, y_n)$ be a sequence of pairs where in each pair $x_i$ is a vector of features and $y_i$ is a label vector, or an estimated label vector. Let k be the number of possible labels, and let $y_{ij}$ denote the $j^{th}$ coordinate of $y_i$. Let $f$ be a function which takes features as input and outputs a k-dimensional vector, and for a feature vector x let $f(x)_j$ denote the $j^{th}$ coordinate of the output of $f(x)$. Then the logistic loss is defined as follows:

$$L = -\sum_{i=1}^{n}\sum_{j=1}^{k} y_{ij}\log f(x_i)_j$$

Conventionally, when this loss function is used, the vectors $y_i$ are label vectors, but since entity A does not know the true label vectors, they might set the vectors $y_i$ to be estimated label vectors instead, according to some embodiments. Using this loss function, the entity with the features (e.g., entity A) proceeds to train a machine learning model using standard methods. For example, they might use gradient descent to train a model with the logistic loss function given above. Optionally, they may add a regularization term to the loss function, as is commonly done in machine learning. When the process is finished, the model thus trained is the function that was wanted, according to some embodiments.

Learning a Joint Function with More than Two Classes

The section above, "Learning a Joint Function" describes one embodiment of how entity A and entity B can collaborate to train a machine learning model, as long there are only two classes (i.e., two possible values for the label column in entity B's dataset). In other embodiments, a more general approach can be used, which can work for any number of classes and includes the method of "Learning a Joint Function" as a special case. In these embodiments, the dataset $D_{synth}$ which entity A produces will have an additional column named weight, having numeric values.

Let k be the number of classes. Entity B generates a sketch $S(D_B)$ of their dataset, the same way as before, in these embodiments. In these embodiments, however, the sketch $S(D_B)$ will be a d×k matrix instead of a d×2 matrix. For each row $(x,f)$ in $D_A$, where x is the identity id and $f$ is the features for that row, these embodiments can perform: (1) Entity A first computes $\ell(x)=v(x)^T S(D_B)$. This is now a k-dimensional vector instead of a two-dimensional vector. (2) Optionally, entity A applies a post-processing step to produce a new vector $\ell'(x)=$post-process$(\ell(x))$. Otherwise, entity A simply takes $\ell'(x)=\ell(x)$ (no post-processing). Two possible post-processing functions are discussed below. (3) For each of the k possible classes, entity A adds a row to $D_{synth}$. Therefore, after this step, $D_{synth}$ will have k times as many rows as $D_A$. All k of these rows will have exactly the same feature values, being those from the original row from $D_A$. The label column will have all k values 1, . . . , k in the k rows. Finally, the k values in the weight column come from the coordinates of $\ell'(x)$: the row with label value i takes the i-th coordinate $\ell'(x)_i$ as its weight.

In some embodiments, entity A can delete any rows with weight=0 from $D_{synth}$ for efficiency. As before, entity A can then proceed to learn a function using whatever method entity A sees fit, using the dataset $D_{synth}$. The method entity A chooses should allow for weighted training examples. The weights will come from the new weight column. The chosen method should accept negative weights, unless the post-processing function eliminates these.

Figure 14:
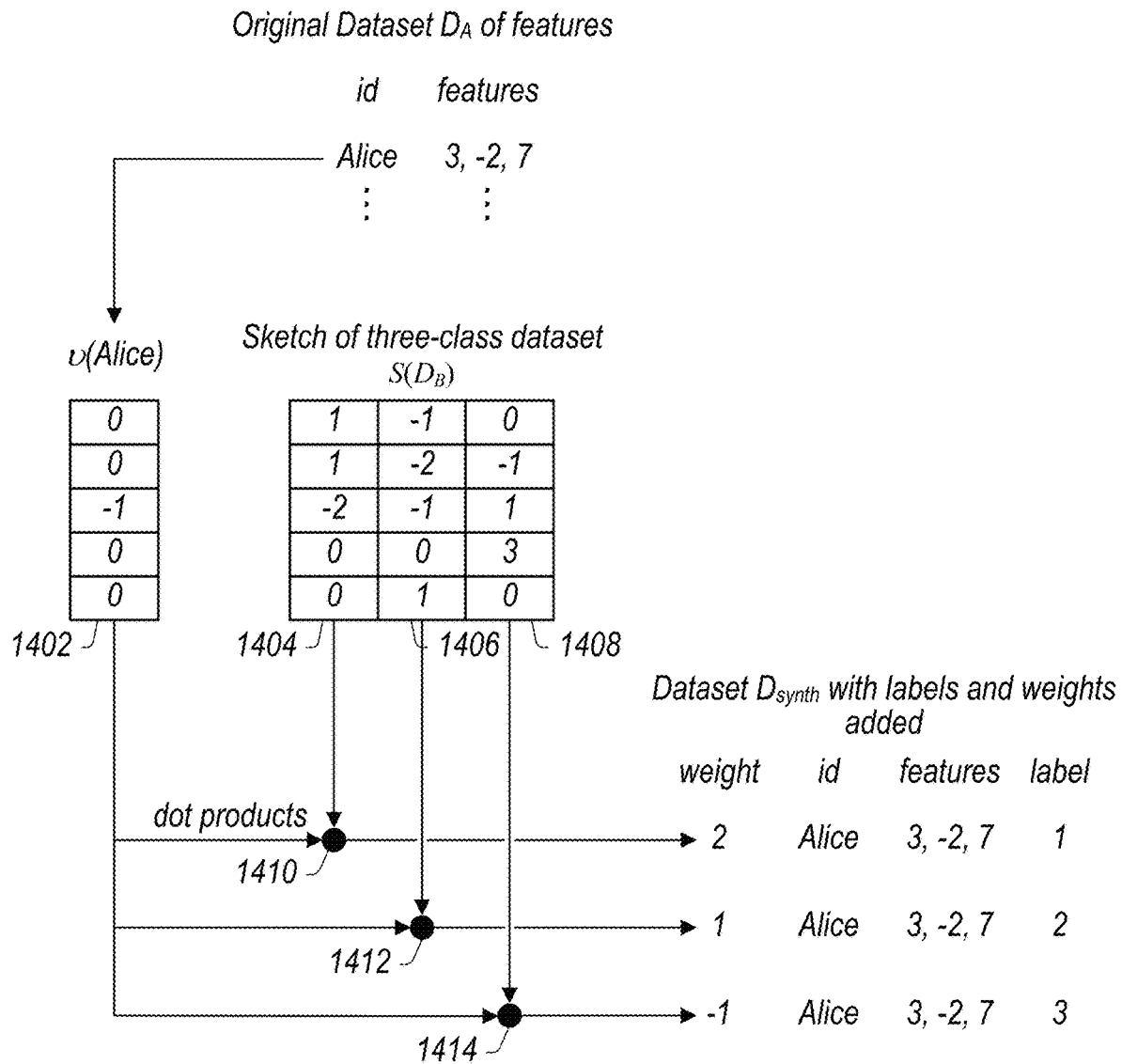
FIG. 14 illustrates a process of estimating a weight vector for an identity "Alice" in a dataset by taking the dot product of the hash vector of the "Alice" identity with each of the 3 columns of a privacy-producing sketch of a different dataset that contains the labels, where the labels can be one of three values, in order to produce a new dataset with added rows corresponding to the identity, where each of the rows contains added columns identifying the label the row corresponds to, and the determined weight corresponding to that label, where the weights were determined by the dot product, according to some embodiments.

FIG. 14 illustrates a process of estimating a weight vector (the estimated weight vector being "2, 1, 1" in this example) for an identity "Alice" in an original dataset $D_A$ by taking the dot product (1410, 1412, 1414) of the hash vector (1402) of the "Alice" identity with each of the 3 columns (1404, 1406, 1408) of a privacy-producing sketch of a different dataset $S(D_B)$ that contains the labels. The labels can be one of three values in this example. A new dataset $D_{synth}$ with labels and weights added is produced. The new dataset $D_{synth}$ contains added rows corresponding to the identity "Alice." For example, FIG. 14 illustrates adding the rows in the new dataset $D_{synth}$ corresponding to a single row in $D_A$ with identity id of "Alice." Each of the rows in the new dataset $D_{synth}$ contains an added column identifying the label the row corresponds to (column "label"), and the determined weight corresponding to that label (column "weight"). The weights were determined by taking the dot product (1410, 1412, 1414) of the hash vector (1402) of the "Alice" identity, with each of the 3 columns (1404, 1406, 1408) of a privacy-producing sketch of a different dataset $S(D_B)$ that contains the labels, according to some embodiments. In the embodiments shown in FIG. 14, the post-processing step is skipped, so that in other words, $\ell'(x)=\ell(x)$.

If k=2, it is possible, in some embodiments, to choose the post-process function so that this method exactly matches that "Learning a Joint Function" section above: set post-process $((a, b))$ to be $(1, 0)$ if $a>b$; $(0, 1)$ if $a<b$, and $(0, 0)$ if $a=b$. Since rows with weight 0 are deleted, this can result in exactly one row with label 1 if $a>b$, one row with label 2 if $a<b$, and no row added if $a=b$. Another example of a post-processing function is to clamp weights to be between 0 and 1: that is, for each class i $\in[k]$, $\ell'(x)_i$ is 0 if $\ell(x)_i<0$, $\ell'(x)_i$ is 1 if $\ell(x)_i>1$, and otherwise $\ell'(x)_i$ is $\ell(x)_i$.

Choosing Parameters

This section describes how to choose the parameters d, h and s as described in the section "Preparation", according to some embodiments. First, two kinds of implementation can be distinguished: implementations where two sketches are published, and implementations where only one sketch is published. Recall that for learning a joint function, only one organization publishes a sketch (the one holding the labels). So, one sketch is published in these embodiments. For estimating a joint PDF, both organizations generate sketches and a third party can use them to estimate the joint PDF. So, two sketches published in these embodiments. A variation can be where only one party publishes a sketch, and the other organization uses their data directly to estimate the joint PDF without publishing their own sketch. So, in these embodiments, one sketch published.

The best value for d depends on whether one sketch or two sketches will be published, according to some embodiments. If one sketch is published, d can be made as large as possible, with the consideration that the sketches will take more space to store as d increases. Larger choices of d will result in more accurate results. If two sketches are published, the best value for d is:

$$d = \frac{1}{2}\epsilon_A \epsilon_B \sqrt{n_A n_B}$$

where $\epsilon_A$ and $\epsilon_B$ are the values of the per-sketch parameter $\epsilon$ chosen by the two organizations, and $n_A$ and $n_B$ are the numbers of rows in the two databases, or estimates thereof. This approximately minimizes the value of the variance of the dot product of two vectors given earlier, and repeated here for reference:

$$\frac{n_A n_B - n_{AB}}{d} + \frac{2n_a}{\epsilon_B^2} + \frac{2n_b}{\epsilon_A^2} + \frac{4d}{\epsilon_A^2 \epsilon_B^2}$$

A good choice for h and s can be to choose a 4-way independent family of hash functions with range {1, 2, . . . , 2d} (integers from 1 to 2d), randomly select a function b from that family, and then define h and s based on b as follows, according to some embodiments. Therefore, for any identity x:

If $b(x) \leq d$, set $h(x)=b(x)$ and $s(x)=1$.

Otherwise $(b(x)>d)$ set $h(x)=b(x)-d$ and $s(x)=-1$.

Some claims in this description about the expected value or variance of certain random processes depend on h and s being chosen in this way.

Evidence

For estimating a joint PDF, an experiment can be generated for three pairs of artificial datasets. Each dataset can have a "name" column containing text, and a "value" column containing numbers from 0 to 1, in this example. In each pair of datasets, the same sequence of names can be used, so that upon joining the datasets in a pair by name, the values would be paired up. In the first pair of datasets, the values in the two datasets can be identical and uniformly cover the range from 0 to 1. In the second pair of datasets, the first dataset can have values ranging uniformly from 0 to 1, with the value for each name in the second dataset being sin(x) where x is the value in the first dataset. In the third pair, the values for a given name can be sin(x) in the first dataset and cos(x) in the second.

Figure 15:
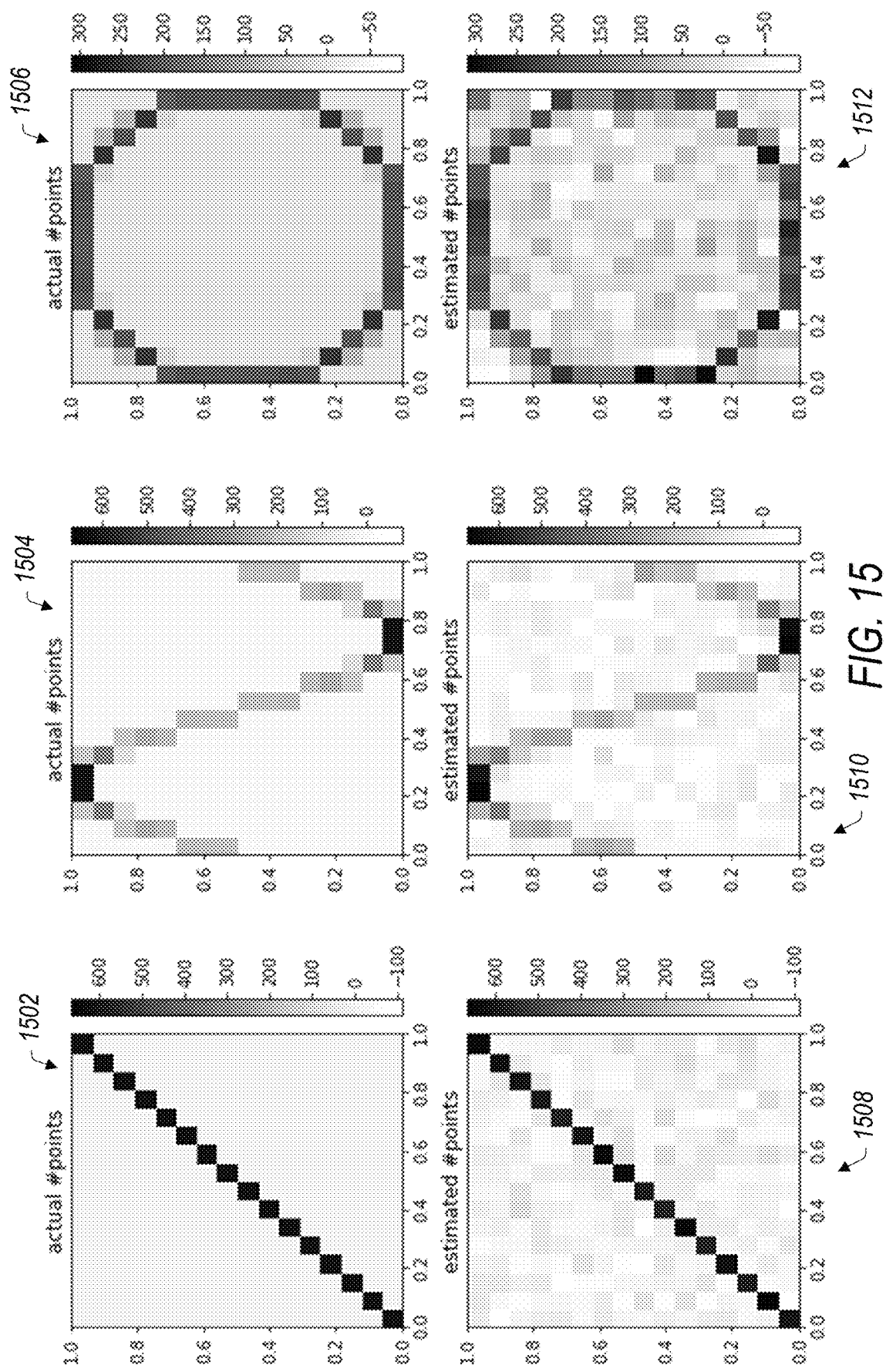
FIG. 15 compares the true joint PDFs of three artificial datasets where users' values are simple mathematical functions ($f(x)=x$, $f(x)=\sin x$, $f(x)=\cos x$) in the top row, with the reconstructed joint PDFs of the same datasets using privacy-preserving dataset sketches in the bottom row, according to some embodiments.

FIG. 15 compares the true joint PDFs of three artificial datasets where users' values are simple mathematical functions (f(x)=x, f(x)=sin x, f(x)=cos x) in the top row, with the reconstructed joint PDFs of the same datasets using privacy-preserving dataset sketches in the bottom row, according to some embodiments. Each artificial dataset had 100,000 rows. A sketch of each dataset was generated setting parameters $\epsilon=1$, $d=4419$, and h and s constructed based on the sha256 cryptographic hash function. The technique described in the section "Estimating a Joint PDF" was then used to reconstruct the joint PDF from the sketches. In FIG. 15, the top row (1502, 1504, 1506) shows the true joint PDF of the three artificial datasets, and the bottom row (1508, 1510, 1512) shows the reconstructed joint PDFs using the techniques of some embodiments of this application.

Figure 16:
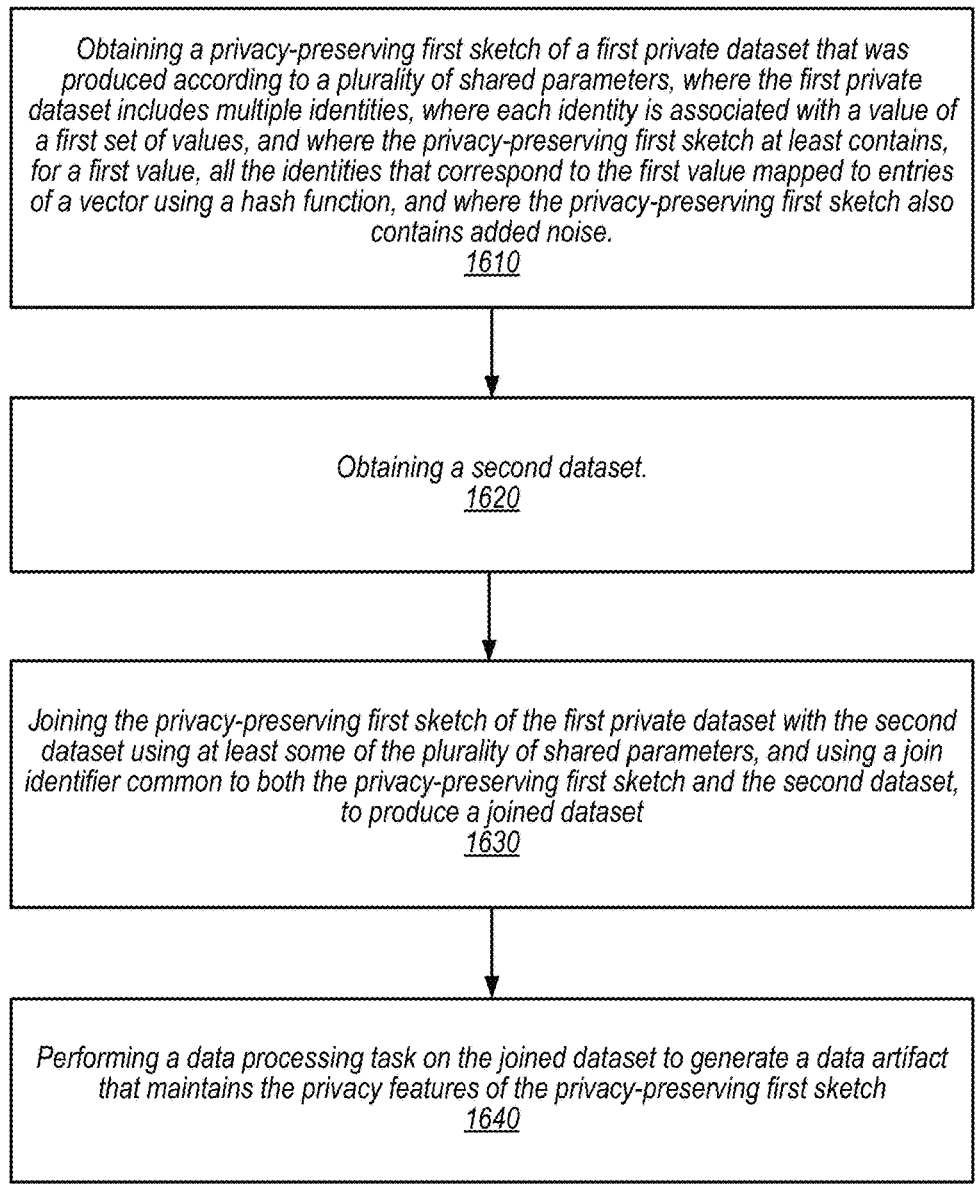
FIG. 16 is a high-level flow chart that illustrates a process for obtaining a privacy-preserving first dataset sketch, obtaining a second dataset, joining the first sketch with the second dataset to produce a joined dataset, and performing a data processing task on the joined dataset to generate a data artifact, according to some embodiments.

Example Methods for Privacy-Preserving Dataset Sketches that can be Joined Non-Interactively FIG. 16 is a high-level flow chart that illustrates a process for obtaining a privacy-preserving first dataset sketch, obtaining a second dataset, joining the first sketch with the second dataset to produce a joined dataset, and performing a data processing task on the joined dataset to generate a data artifact, according to some embodiments. The flowchart begins at block 1610 which obtains a privacy-preserving first sketch of a first private dataset that was produced according to a plurality of shared parameters. This first private dataset includes multiple identities, where each identity is associated with a value of a first set of values. The privacy-preserving first sketch at least contains, for a first value, all the identities that correspond to the first value mapped to entries of a vector using a hash function. The privacy-preserving first sketch might also contain, for a second value of the first set of values, all the identities that correspond to the second value mapped to entries of a second vector using the hash function. The privacy-preserving first sketch might also contain, for other values of the first set of values, all the identities that correspond to the respective other values mapped to entries of respective other vectors using the hash function. The privacy-preserving first sketch also contains added noise. The flowchart then transitions to 1620 which obtains a second dataset. Next, step 1630 joins the privacy-preserving first sketch of the first private dataset with the second dataset using at least some of the plurality of shared parameters, and using a join identifier common to both the privacy-preserving first sketch and the second dataset, to produce a joined dataset. Finally, the flowchart transitions to block 1640 which performs a data processing task on the joined dataset to generate a data artifact that maintains the privacy features of the privacy-preserving first sketch.

Figure 17:
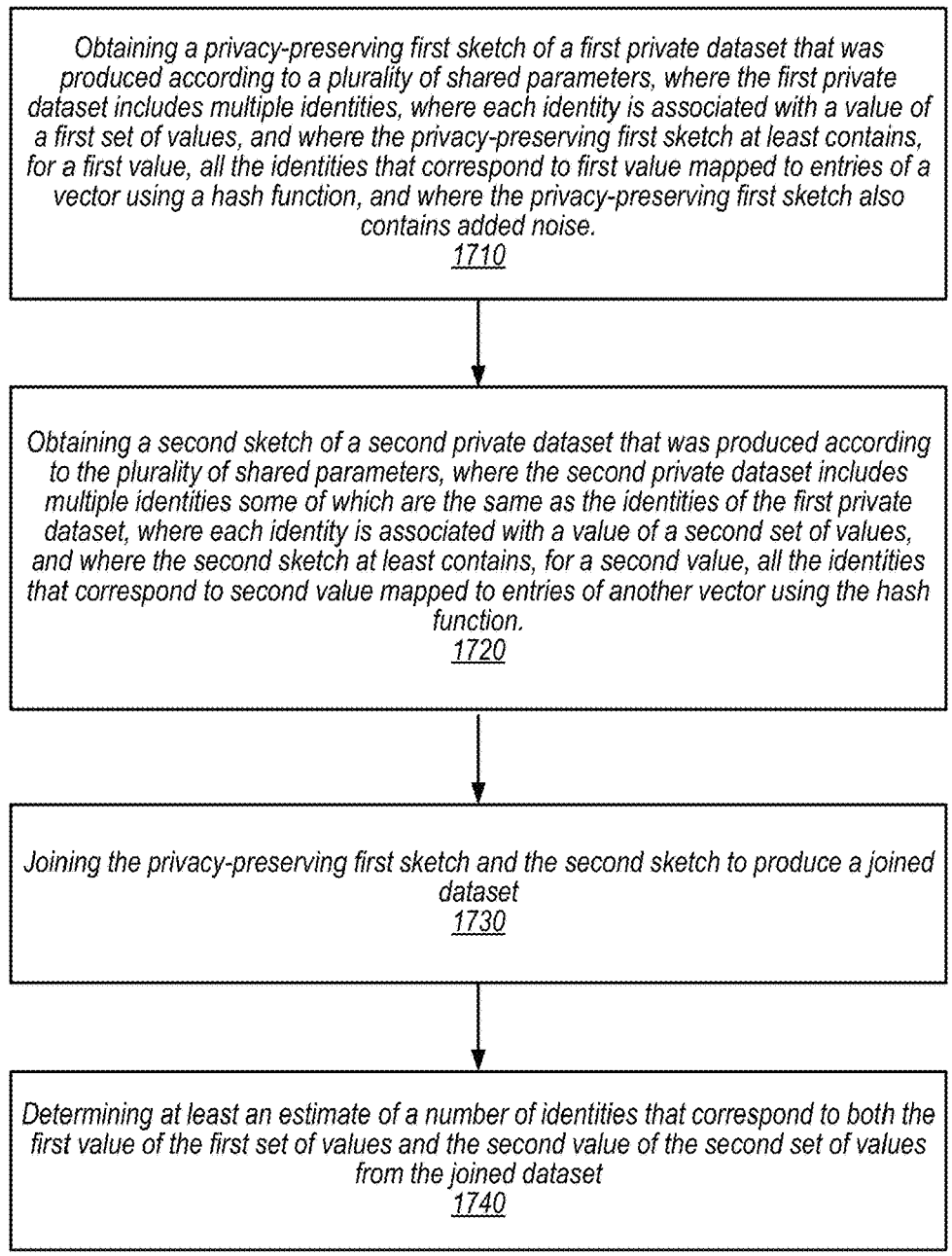
FIG. 17 is a high-level flow chart that illustrates a process for joining a privacy preserving first sketch of a first dataset, and a second sketch of a second dataset, to produce a joined dataset, and determining an estimate of a number of identities that correspond to both a first value of the first dataset and a second value of the second dataset from the joined dataset, according to some embodiments.

FIG. 17 is a high-level flow chart that illustrates a process for joining a privacy preserving first sketch of a first dataset, and a second sketch of a second dataset, to produce a joined dataset, and determining an estimate of a number of identities that correspond to both a first value of the first dataset and a second value of the second dataset from the joined dataset, according to some embodiments. The flowchart begins at block 1710 which obtains a privacy-preserving first sketch of a first private dataset that was produced according to a plurality of shared parameters. This first private dataset includes multiple identities, where each identity is associated with a value of a first set of values. The privacy-preserving first sketch at least contains, for a first value of the first set of values, all the identities that correspond to the first value mapped to entries of a vector using a hash function. The privacy-preserving first sketch might also contain, for other values of the first set of values, all the identities that correspond to the respective other values mapped to entries of respective other vectors using the hash function. The privacy-preserving first sketch also contains added noise. The flowchart transitions to block 1720 which obtains a second sketch of a second private dataset that was produced according to the plurality of shared parameters. The second private dataset includes multiple identities some of which are the same as the identities of the first private dataset. Each identity is associated with a value of a second set of values. The second sketch at least contains, for a second value of the second set of values, all the identities that correspond to second value mapped to entries of a second vector using the hash function. The second sketch might also contain, for other values of the second set of values, all the identities that correspond to the respective other values mapped to entries of respective other vectors using the hash function. The flowchart then transitions to 1730 which joins the privacy-preserving first sketch and the second sketch to produce a joined dataset. The flowchart transitions to block 1740 which determines at least an estimate of a number of identities that correspond to both the first value of the first set of values and the second value of the second set of values from the joined dataset.

Figure 18:
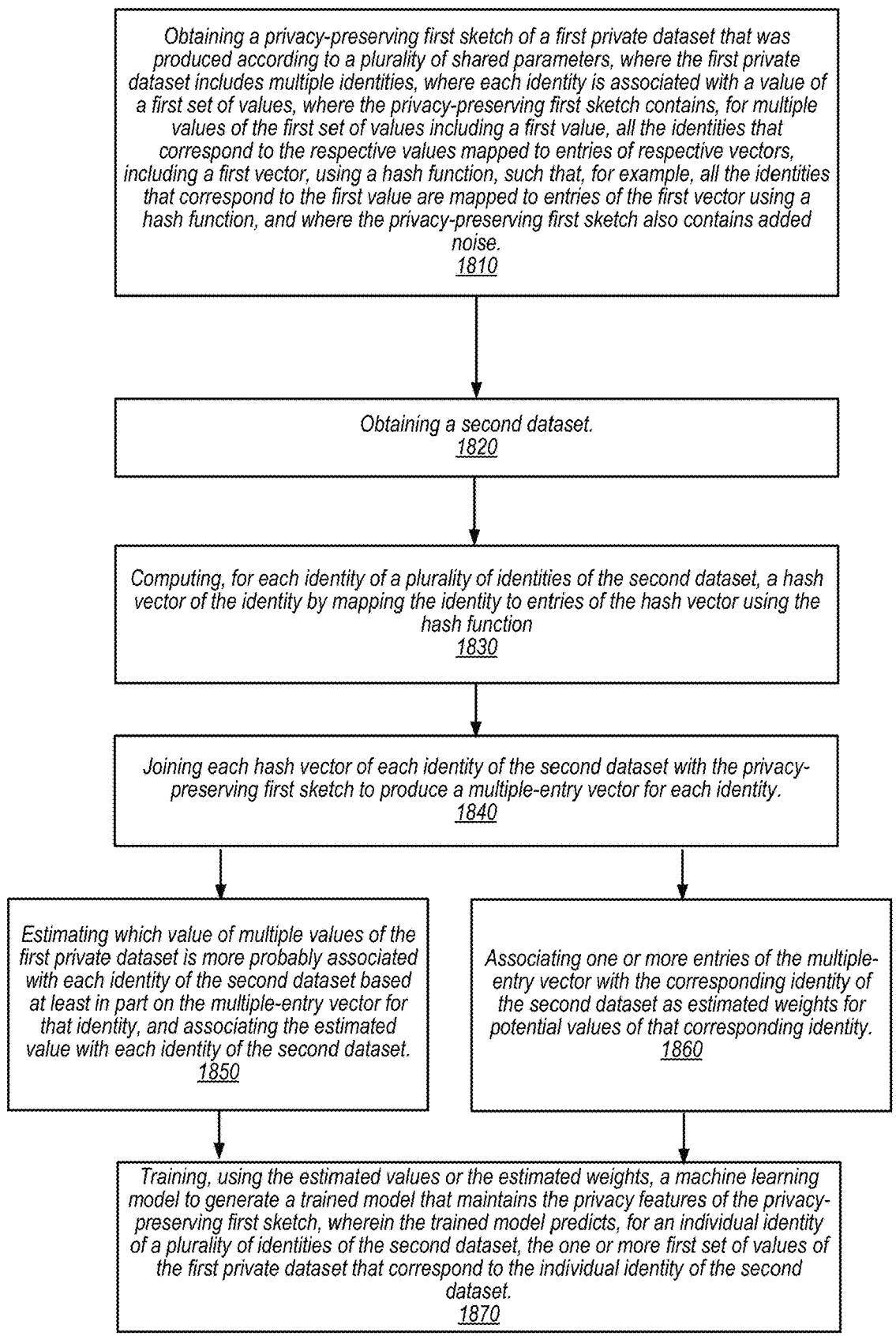
FIG. 18 is a high-level flow chart that illustrates a process for training a machine learning model that can predict a value of the first private dataset that corresponds to an identity of a second private dataset, according to some embodiments.

FIG. 18 is a high-level flow chart that illustrates a process for training a machine learning model that can predict a value of the first private dataset that corresponds to an identity of a second private dataset, according to some embodiments. The flowchart begins at block 1810 which obtains a privacy-preserving first sketch of a first private dataset that was produced according to a plurality of shared parameters. This first private dataset includes multiple identities, where each identity is associated with a value of a first set of values. The privacy-preserving first sketch contains, for multiple values of the first set of values including a first value, all the identities that correspond to the respective values mapped to entries of respective vectors, including a first vector, using a hash function. This necessarily results in, for example, all the identities that correspond to the first value mapped to entries of the first vector using the hash function. The privacy-preserving first sketch also contains added noise. The flowchart then transitions to 1820 which obtains a second dataset.

In block 1830, the method computes, for each identity of a plurality of identities of the second dataset, a hash vector of the identity by mapping the identity to entries of the hash vector using the hash function. This results in a hash vector for each identity of the second dataset. Then, in block 1840, the method joins each hash vector of each identity of the second dataset with the privacy-preserving first sketch to produce a multiple-entry vector for each identity. The number of entries in each multiple-entry vector corresponds to the number of vectors in the privacy-preserving first sketch. The method then transitions to either block 1850 or block 1860. Block 1850 estimates which value between the multiple values of the first private dataset is more probably associated with each identity of the second dataset based at least in part on the multiple-entry vector for that identity. The method associates the estimated value with its corresponding identity of the second dataset. Block 1860, in turn, associates one or more entries of the multiple-entry vector with the corresponding identity of the second dataset as estimated weights for potential values of that corresponding identity. Both blocks 1850 and 1860 then transition to the final block 1870. In block 1870 the method trains, using the estimated values or the estimated weights, a machine learning model to generate a trained model that maintains the privacy features of the privacy-preserving first sketch. The trained model predicts, for an individual identity of a plurality of identities of the second dataset, the one or more first set of values of the first private dataset that correspond to that individual identity of the second dataset.

Figure 19:
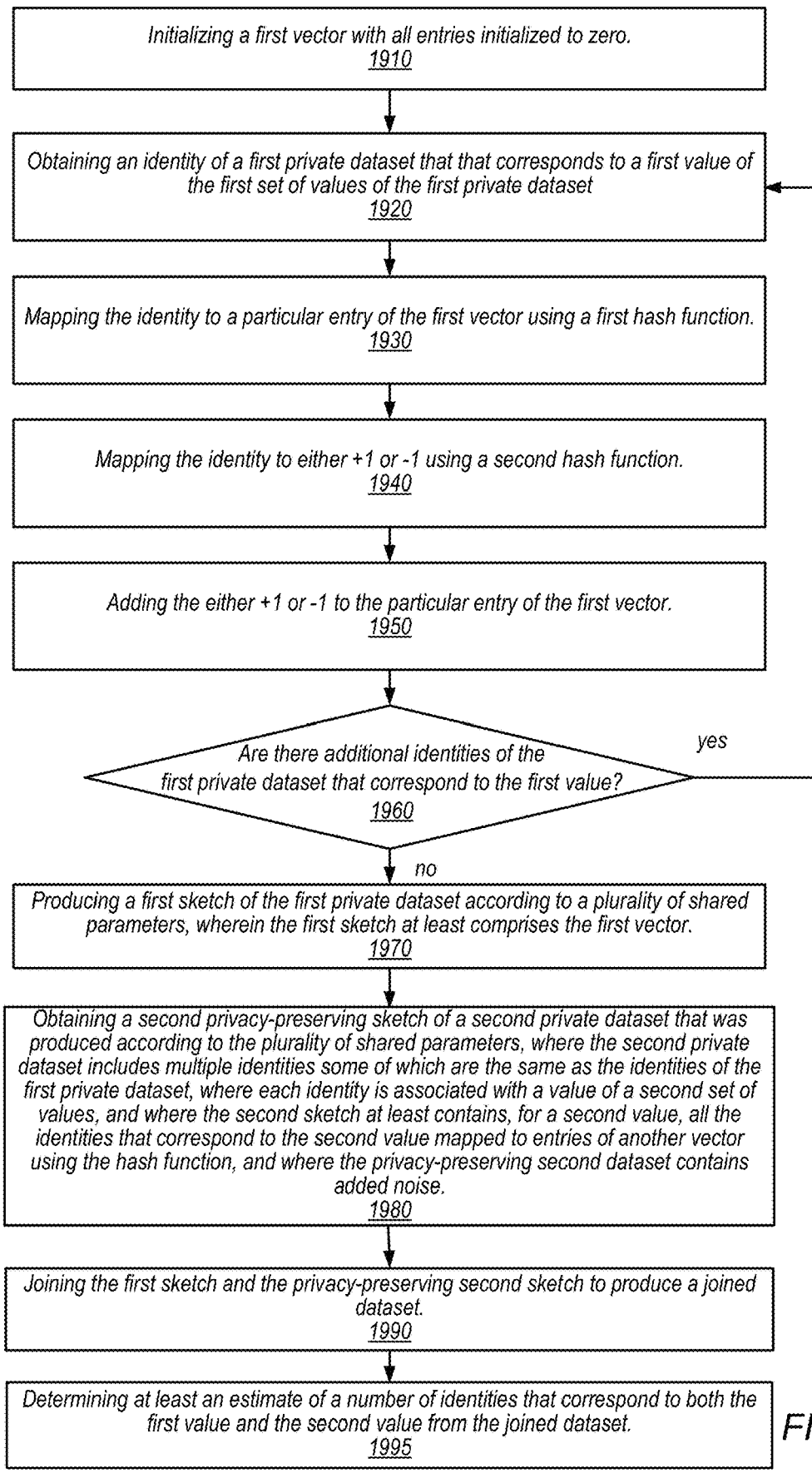
FIG. 19 is a high-level flow chart that illustrates a process for producing a first sketch of the first private dataset, obtaining a second privacy preserving sketch of a second private dataset, joining the first and second sketches, and determining an estimate of a number of identities that correspond to both the first value and the second value from the joined dataset.

FIG. 19 is a high-level flow chart that illustrates a process for producing a first sketch of the first private dataset, obtaining a second privacy preserving sketch of a second private dataset, joining the first and second sketches, and determining an estimate of a number of identities that correspond to both the first value and the second value from the joined dataset. The method begins at 1910 which initializes a first vector with all entries initialized to zero. Block 1920 then obtains an identity of a first private dataset that that corresponds to a first value of the first set of values of the first private dataset. The flowchart transitions to block 1930 which maps the obtained identity to a particular entry of the first vector using a first hash function. Then, in block 1940, the method maps the identity to either +1 or −1 using a second hash function. The method then, in block 1950, adds the either +1 or −1 to the particular entry of the first vector that was determined in block 1930. Block 1960 determines whether there are additional identities of the first private dataset that that correspond to the first value. If there are additional identities of the first private dataset that correspond to the first value, then the flowchart transitions back to 1920 to repeat the above described process for the additional identity of a first private dataset that that corresponds to the first value of the first set of values of the first private dataset.

If there are not additional identities of the first private dataset that correspond to the first value, then the flowchart transitions to block 1970 which produces a first sketch of the first private dataset according to a plurality of shared parameters, wherein the first sketch at least comprises the first vector. The first sketch might also contain, for other values of the first set of values, all the identities that correspond to the respective other values mapped to entries of respective other vectors using the hash function. The flowchart then transitions to block 1980 which obtains a privacy-preserving second sketch of a second private dataset that was produced according to the plurality of shared parameters. The second private dataset includes multiple identities some of which are the same as the identities of the first private dataset. Each identity of the second private dataset is associated with a value of a second set of values. The second sketch at least contains, for a second value of the second set of values, all the identities that correspond to the second value mapped to entries of another vector using the hash function. The second sketch might also contain, for other values of the second set of values, all the identities that correspond to the respective other values of the second set of values mapped to entries of respective other vectors using the hash function. The privacy-preserving second dataset contains added noise. The flowchart then transitions to block 1990 which joins the first sketch and the privacy-preserving second sketch. Finally, in step 1995, the method determines at least an estimate of a number of identities that correspond to both the first value and the second value from the joined dataset.

The methods described herein may in various embodiments be implemented by any combination of hardware and software. For example, in one embodiment, the methods may be implemented by a computer system (e.g., a computer system as in FIG. 19) that includes one or more processors executing program instructions stored on a computer-readable storage medium coupled to the processors. The program instructions may be configured to implement the functionality described herein (e.g., the functionality of various servers and other components that implement the privacy-preserving dataset joining system described herein). The various methods as illustrated in the figures and described herein represent example embodiments of methods. The order of any method may be changed, and various elements may be added, reordered, combined, omitted, modified, etc.

Figure 20:
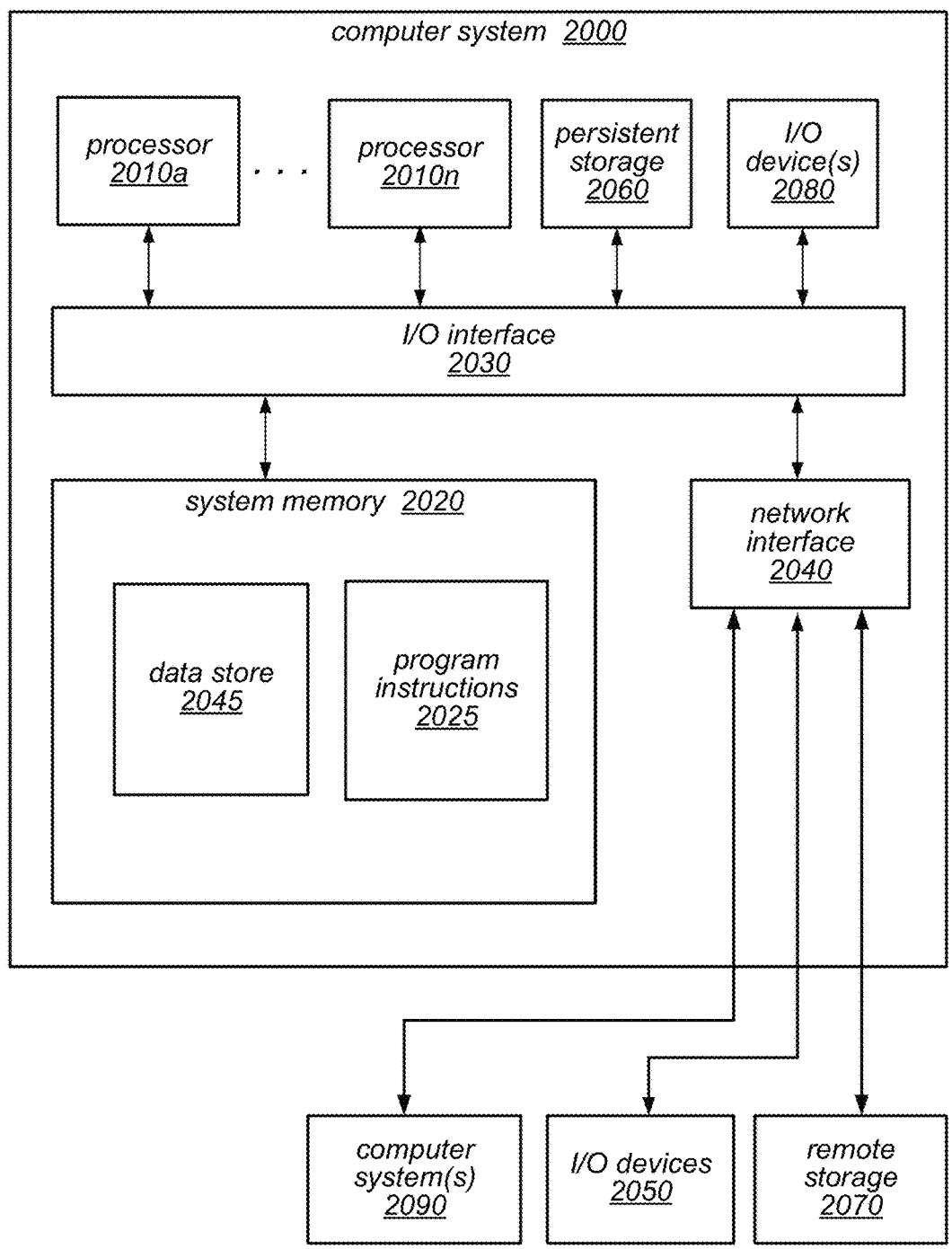
FIG. 20 is a block diagram illustrating an example computer system that can be used to implement one or more components of a system that performs privacy-preserving dataset sketches that can be joined non-interactively, according to some embodiments.

Example Computer System for Privacy-Preserving Dataset Sketches that can be Joined Non-Interactively Embodiments of privacy-preserving dataset sketches that can be joined non-interactively as described herein may be executed on one or more computer systems, which may interact with various other devices. FIG. 20 is a block diagram illustrating an example computer system, according to various embodiments. For example, computer system 2000 may be configured to implement nodes of a provider network, such as may implement various resources, a control plane, or diagnostic agents, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device, compute node, or computing node.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a provider network, in different embodiments. In some embodiments, program instructions 2025 may implement multiple separate clients, nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more nodes, endpoints, systems, or services internal to or external to a provider network, and/or clients of the provider network described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 20 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow. It is intended that the following claims be interpreted to embrace all such modifications and changes and, accordingly, the above description to be regarded in an illustrative rather than a restrictive sense.

What is claimed is:

1. A system comprising:
one or more computers of an entity configured to implement a privacy-preserving dataset joining system to:
receive a query that specifies a join operation to be performed on contents of at least a first private dataset of the entity and a second private dataset of a different entity;
in response to receiving the query:
produce a first sketch of the first private dataset according to a plurality of shared parameters, wherein the first private dataset comprises a plurality of identities, wherein individual identities of the plurality of identities of the first private dataset correspond with at least one value of a first set of values, and wherein the first sketch at least comprises, for a first value of the first set of values, a mapping, to entries of a first instance of a data structure using a hash function, of a first set of identities of the plurality of identities that correspond to the first value;
obtain a privacy-preserving second sketch of the second private dataset that was produced according to the plurality of shared parameters, wherein the second private dataset comprises at least some identities of the plurality of identities, wherein individual identities of the at least some identities of the second private dataset correspond with at least one value of a second set of values, wherein the privacy-preserving second sketch at least comprises, for a second value of the second set of values, a mapping, to entries of a second instance of the data structure using the hash function, of a second set of identities of the at least some identities that correspond to the second value, and wherein the privacy-preserving second sketch further comprises added noise;

join the first sketch and the privacy-preserving second sketch to produce a joined dataset;

determine an estimate of a number of identities that correspond to both the first value of the first set of values and the second value of the second set of values from the joined dataset; and respond to the query with the estimate of the number of identities that correspond to both the first value and the second value.

2. The system of claim 1, wherein a second hash function maps the plurality of identities to either positive one or negative one, and wherein to map, to the entries of the first instance of the data structure using the hash function, the first set of identities that correspond to the first value, the one or more computers are further configured to:

initialize the first instance of the data structure with all entries initialized to zero; and for each particular identity of the first set of identities that correspond to the first value of the first set of values:

map the particular identity to a particular entry of the first instance of the data structure using the hash function;

map the particular identity to either positive one or negative one using the second hash function; and add the either positive one or negative one to the particular entry of the first instance of the data structure.

3. The system of claim 1, wherein the noise added to the second sketch comprises a third instance of the data structure, wherein individual entries of the third instance of the data structure are sampled from a two-sided geometric distribution.

4. The system of claim 1, wherein the first sketch further comprises, for a third value of the first set of values of the first private dataset, a mapping, to entries of a third instance of the data structure using the hash function, of a third set of identities of the plurality of identities of the first private dataset that correspond to the third value;

wherein the privacy-preserving second sketch further comprises, for a fourth value of the second set of values of the second private dataset, a mapping, to entries of a fourth instance of the data structure using the hash function, of a fourth set of identities of the at least some identities of the second private dataset that correspond to the fourth value;

wherein the one or more computers are further configured to:

determine, from the joined dataset: (a) a second estimate of a number of identities that correspond to both the first value of the first set of values and the fourth value of the second set of values, (b) a third estimate of a number of identities that correspond to both the third value of the first set of values and the second value of the second set of values, and (c) a fourth estimate of a number of identities that correspond to both the third value of the first set of values and the fourth value of the second set of values, in addition to the determining the estimate of the number of identities that correspond to both the first value of the first set of values and the second value of the second set of values.

5. The system of claim 1, wherein the first instance of the data structure is a first vector, wherein the second instance of the data structure is a second vector of the same size as the first vector, and wherein to join the first sketch and the privacy-preserving second sketch, the one or more computers are further configured to at least:

compute the dot product of the first vector and the second vector.

6. A method comprising:

obtaining a privacy-preserving first sketch of a first private dataset that was produced according to a plurality of shared parameters, wherein the first private dataset comprises a plurality of identities, wherein individual identities of the plurality of identities of the first private dataset correspond with at least one value of a first set of values, and wherein the privacy-preserving first sketch at least comprises, for a first value of the first set of values, a mapping, to entries of a first instance of a data structure using a hash function, of a first set of identities of the plurality of identities that correspond to the first value, and wherein the privacy-preserving first sketch further comprises added noise;

obtaining a second dataset;

joining the privacy-preserving first sketch of the first private dataset with the second dataset using at least some of the plurality of shared parameters, and using a join identifier common to both the privacy-preserving first sketch and the second dataset, to produce a joined dataset; and performing a data processing task on the joined dataset to generate a data artifact that maintains the privacy features of the privacy-preserving first sketch.

7. The method of claim 6, wherein the second dataset is a second sketch of a second private dataset;

wherein the obtaining the second dataset further comprises:

obtaining the second sketch of the second private dataset that was produced according to the plurality of shared parameters, wherein the second private dataset comprises at least some identities of the plurality of identities, wherein individual identities of the at least some identities of the second private dataset correspond with at least one value of a second set of values, wherein the second sketch at least comprises, for a second value of the second set of values, a mapping, to entries of a second instance of the data structure using the hash function, of a second set of identities of the at least some identities that correspond to the second value; and wherein the performing the data processing task on the joined dataset to generate the data artifact that maintains the privacy features of the privacy-preserving first sketch further comprises:

performing a data processing task on the joined dataset to generate a joint distribution that maintains the privacy features of at least the privacy-preserving first sketch; and determining, based at least in part on the joint distribution, an estimate of a number of identities that correspond to both the first value of the first set of values and the second value of the second set of values.

8. The method of claim 7, wherein the second sketch of the second private dataset is a privacy-preserving second sketch of the second private dataset comprising added noise, wherein the privacy-preserving first sketch of the first private dataset was produced by a first entity, wherein the privacy-preserving second sketch of the second private dataset was produced by a second entity, and wherein the obtaining the privacy-preserving first sketch, the obtaining the privacy-preserving second sketch, the joining, and the determining are performed by a third entity different than either the first or second entity.

9. The method of claim 7, wherein the first instance of the data structure is a first vector, wherein the second instance of the data structure is a second vector of the same size as the first vector, and wherein the size of the first vector and the second vector is an estimate of a count of the identities in the second private dataset.

10. The method of claim 7, wherein the privacy-preserving first sketch of the first private dataset was produced by a first entity, wherein the second private dataset is associated with a second entity different than the first entity, wherein the second sketch of the second private dataset is not a privacy-preserving second sketch of the second private dataset, and does not comprise added noise, wherein the obtaining the privacy-preserving first sketch of the first private dataset, the joining, and the performing the data processing task are performed by the second entity, and wherein the obtaining the second sketch of the second private dataset according to the plurality of shared parameters further comprises:
  mapping, by the second entity, the second set of identities of the plurality of identities that correspond to the second value, to the entries of the second instance of the data structure using the hash function; and
  producing, by the second entity, the second sketch of the second private dataset according to the plurality of shared parameters, wherein the second sketch at least comprises the mapping.

11. The method of claim 10, wherein a second hash function maps the plurality of identities to either positive one or negative one, and wherein the mapping, by the second entity, of the second set of identities of the plurality of identities that correspond to the second value, to the entries of the second instance of the data structure using the hash function further comprises:
  initializing the second instance of the data structure with all entries initialized to zero; and
  for each particular identity of the second set of identities that correspond to the second value of the second set of values:
    mapping the particular identity to a particular entry of the second instance of the data structure using the hash function;
    mapping the particular identity to either positive one or negative one using the second hash function; and
    adding the either positive one or negative one to the particular entry of the second instance of the data structure.

12. The method of claim 11, wherein the first hash function and the second hash function are mutually four-way independent.

13. The method of claim 6, wherein the performing the data processing task on the joined dataset to generate the data artifact that maintains the privacy features of the privacy-preserving first sketch further comprises:
  training a machine learning model on the joined dataset to generate a trained model that maintains the privacy features of the privacy-preserving first sketch, wherein the trained model predicts, for a particular identity of a plurality of identities of the second dataset, one or more of the first set of values of the first private dataset that correspond to the particular identity of the second dataset.

14. The method of claim 13, wherein the privacy-preserving first sketch further comprises, for respective multiple values of the first set of values of the first private dataset, including the first value, a mapping to entries of respective multiple instances of the data structure using the hash function, of respective multiple sets of identities of the plurality of identities of the first private dataset that correspond to the respective values, such that the first set of identities that correspond to the first value of the first set of values are mapped to the entries of the first instance of the data structure using the hash function, and wherein the joining of the privacy-preserving first sketch of the first private dataset with the second dataset to produce a joined dataset further comprises:
  computing, for the particular identity of the plurality of identities of the second dataset, a hash vector of the particular identity by mapping the particular identity to entries of the hash vector using the hash function;
  joining the hash vector of the particular identity of the second dataset with the privacy-preserving first sketch to produce a multiple-entry vector;
  associating one or more entries of the multiple-entry vector with the particular identity of the second dataset.

15. The method of claim 6, wherein the plurality of shared parameters comprise at least the hash function and a size of the data structure.

16. One or more non-transitory, computer-readable storage media, storing program instructions that when executed on or across one or more computing devices of a privacy-preserving dataset joining system, cause the one or more computing devices to perform:
  obtain a privacy-preserving first sketch of a first private dataset that was produced according to a plurality of shared parameters, wherein the first private dataset comprises a plurality of identities, wherein individual identities of the plurality of identities of the first private dataset correspond with at least one value of a first set of values, and wherein the privacy-preserving first sketch at least comprises, for a first value of the first set of values, a mapping, to entries of a first instance of a data structure using a hash function, of a first set of identities of the plurality of identities that correspond to the first value, and wherein the privacy-preserving first sketch further comprises added noise;
  obtain a second dataset;
  join the privacy-preserving first sketch of the first private dataset with the second dataset using at least some of the plurality of shared parameters, and using a join identifier common to both the privacy-preserving first sketch and the second dataset, to produce a joined dataset; and
  perform a data processing task on the joined dataset to generate a data artifact that maintains the privacy features of the privacy-preserving first sketch.

17. The one or more non-transitory, computer-readable storage media of claim 16,
  wherein the second dataset is a second sketch of a second private dataset;
  wherein to obtain the second dataset, the program instructions further cause the one or more computing devices of the privacy-preserving dataset joining system to further perform:
  obtain the second sketch of the second private dataset that was produced according to the plurality of shared parameters, wherein the second private dataset comprises at least some identities of the plurality of identities, wherein individual identities of the at least some identities of the second private dataset correspond with at least one value of a second set of values, wherein the second sketch at least comprises, for a second value of the second set of values, a mapping, to entries of a second instance of the data structure using the hash function, of a second set of identities of the at least some identities that correspond to the second value; and wherein to perform the data processing task on the joined dataset to generate the data artifact that maintains the privacy features of the privacy-preserving first sketch, the program instructions further cause the one or more computing devices of the privacy-preserving dataset joining system to further perform:

perform a data processing task on the joined dataset to generate a joint distribution that maintains the privacy features of at least the privacy-preserving first sketch; and determine, based at least in part on the joint distribution, an estimate of a number of identities that correspond to both the first value of the first set of values and the second value of the second set of values.

18. The one or more non-transitory, computer-readable storage media of claim 17, wherein the one or more computing devices of the privacy-preserving dataset joining system are of a second entity, wherein the second sketch of the second private dataset is not a privacy-preserving second sketch of the second private dataset, and does not comprise added noise, wherein the privacy-preserving first sketch of the first private dataset was produced by a first entity different than the second entity, and wherein to obtain the second sketch of the second private dataset according to the plurality of shared parameters, the program instructions further cause the one or more computing devices of the privacy-preserving dataset joining system of the second entity to further perform:

map the second set of identities of the plurality of identities that correspond to the second value, to the entries of the second instance of the data structure using the hash function; and produce the second sketch of the second private dataset according to the plurality of shared parameters, wherein the second sketch at least comprises the mapping.

19. The one or more non-transitory, computer-readable storage media of claim 18, wherein a second hash function maps the plurality of identities to either positive one or negative one, and wherein to map the second set of identities of the plurality of identities that correspond to the second value, to the entries of the second instance of the data structure using the hash function, the program instructions further cause the one or more computing devices of the privacy-preserving dataset joining system of the second entity to further perform:

initialize the second instance of the data structure with all entries initialized to zero; and for each particular identity of the second set of identities that correspond to the second value of the second set of values:

map the particular identity to a particular entry of the second instance of the data structure using the hash function;

map the particular identity to either positive one or negative one using the second hash function; and add the either positive one or negative one to the particular entry of the second instance of the data structure.

20. The one or more non-transitory, computer-readable storage media of claim 16, wherein to perform the data processing task on the joined dataset to generate the data artifact that maintains the privacy features of the privacy-preserving first sketch, the program instructions further cause the one or more computing devices of the privacy-preserving dataset joining system to further perform:

train a machine learning model on the joined dataset to generate a trained model that maintains the privacy features of the privacy-preserving first sketch, wherein the trained model predicts, for an individual identity of a plurality of identities of the second dataset, one or more of the first set of values of the first private dataset that correspond to the individual identity of the second dataset.

* * * * *